US008519968B2

(12) United States Patent
Terai

(10) Patent No.: US 8,519,968 B2
(45) Date of Patent: Aug. 27, 2013

(54) PORTABLE INFORMATION TERMINAL, HOLD STATUS SWITCH METHOD AND RECORDING MEDIUM

(75) Inventor: Takao Terai, Kanagawa (JP)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 12/561,489

(22) Filed: Sep. 17, 2009

(65) Prior Publication Data

US 2010/0103145 A1    Apr. 29, 2010

(30) Foreign Application Priority Data

Oct. 28, 2008  (JP) .................................. 2008-276226

(51) Int. Cl.
*G06F 3/02*   (2006.01)

(52) U.S. Cl.
USPC ............................ 345/173; 345/156; 345/211

(58) Field of Classification Search
None
See application file for complete search history.

(56) References Cited

U.S. PATENT DOCUMENTS

| | | | | |
|---|---|---|---|---|
| 7,463,239 B2 * | 12/2008 | Ledbetter et al. | ............. | 345/156 |
| 2005/0057522 A1 * | 3/2005 | Godler | ......................... | 345/173 |
| 2006/0197753 A1 * | 9/2006 | Hotelling | ........................ | 345/173 |
| 2007/0109291 A1 * | 5/2007 | Hoshino et al. | ................ | 345/211 |
| 2008/0106513 A1 * | 5/2008 | Morotomi et al. | ............ | 345/156 |
| 2009/0040235 A1 * | 2/2009 | Matsuda | ....................... | 345/619 |
| 2010/0161091 A1 * | 6/2010 | Takatsuka | ........................ | 700/94 |

FOREIGN PATENT DOCUMENTS

| | | |
|---|---|---|
| JP | 5-94248 | 4/1993 |
| JP | 2000-137565 | 5/2000 |
| JP | 2002-268776 | 9/2002 |
| JP | 2008-102701 | 5/2008 |
| JP | 2008-537615 | 9/2008 |

OTHER PUBLICATIONS

JP 2008-97934 Amano T Apr. 24, 2006 Bidirectional slide-switch apparatus used in e.g. mobile phone, has operation element arranged in slide groove by accommodating spring provided in operation element in spring accommodating portion of slide groove.*
JP2002-268776 Tahira Takehiko Sep. 20, 2002 (English Translation).*
Office Action issued May 22, 2012, in Japanese patent Application No. 2008-276226.

* cited by examiner

*Primary Examiner* — Van Chow
(74) *Attorney, Agent, or Firm* — Oblon, Spivak, McClelland, Maier & Neustadt, L.L.P.

(57) ABSTRACT

A portable information terminal is provided which includes detecting means for detecting an operation on a display screen, a button for an operation related to a content reproduction, a changeover switch, and a control unit which switches hold statuses of the detecting means and the button according to an operation to the changeover switch.

13 Claims, 15 Drawing Sheets

| POSITION | A | B | C |
|---|---|---|---|
| HOLD STATUS | (a) | (b) | (c) |
| T/P102 | OFF | ON | ON |
| CONTROL BUTTON 104 | OFF | OFF | ON |

| POSITION | A | B | |
|---|---|---|---|
| HOLD STATUS | (a) | (b) | (c) |
| T/P102 | ON | ON | OFF |
| CONTROL BUTTON 104 | ON | OFF | OFF |

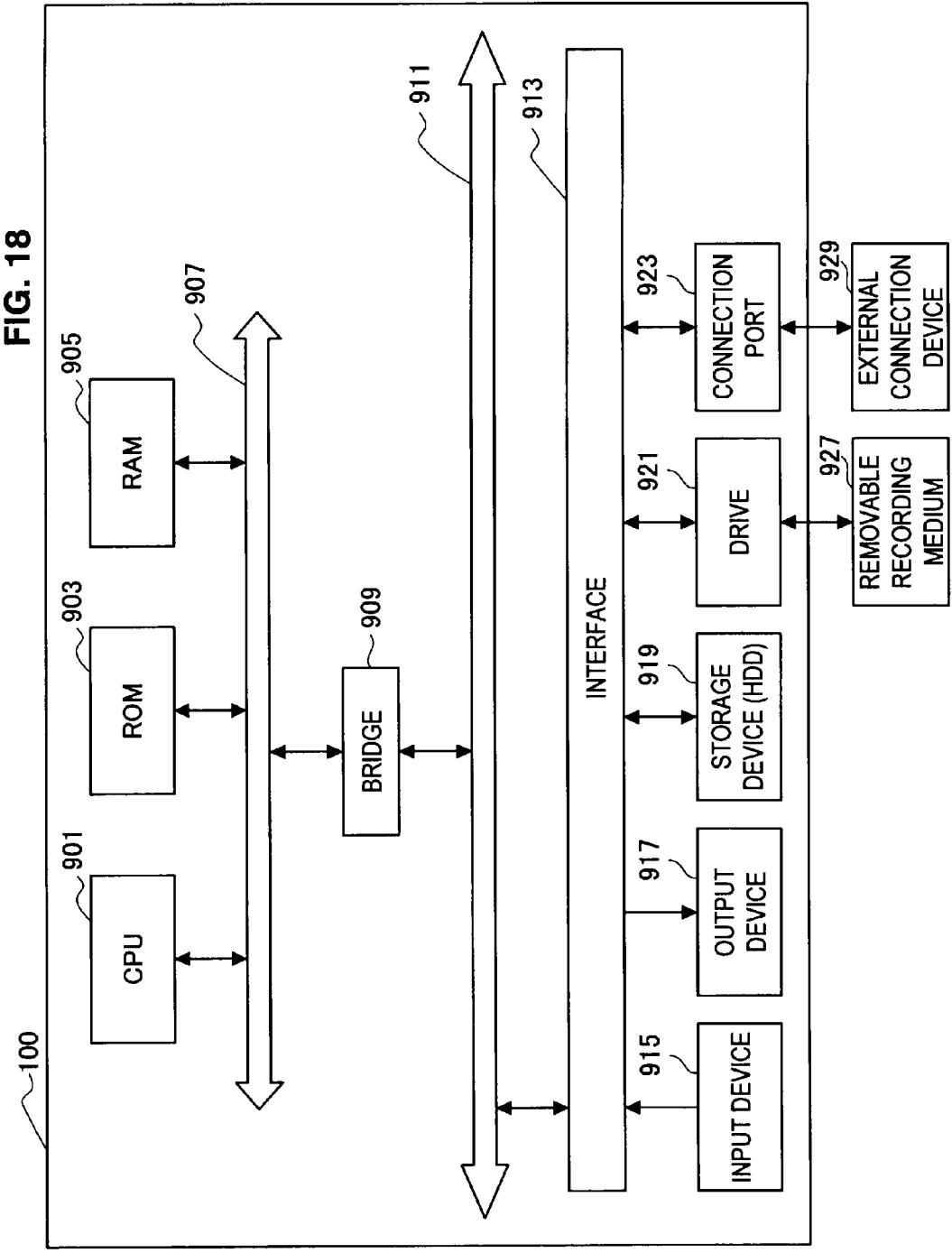

PORTABLE INFORMATION TERMINAL, HOLD STATUS SWITCH METHOD AND RECORDING MEDIUM

BACKGROUND OF THE INVENTION

1. Field of the Invention

The present invention relates to a portable information terminal, a hold status switch method and a recording medium.

2. Description of the Related Art

Recently, portable music players, in which a storage medium such as a hard disk stores music data and a CPU (Central Processing Units) processes the music data to reproduce the music, are widely used. Many of this type of portable music players have various functions such as a moving image reproduction, a still image reproduction, a photographing function and a communicating function in addition to a music reproduction.

Due to the diversification of the functions, those portable music players often have a touch panel function, which shows various operation buttons as GUI (Graphical User Interface) buttons on a display and receives user's operations. However, since the touch panel function recognizes an operation input by a user by pressing on the display for example, there has been a malfunction such that the user may accidentally press a stop button on the display during a music reproduction and the music reproduction is interrupted. In order to prevent such a malfunction, a portable music player in related art has a hold switch on its body and has a hold function, which allows switching the validity and invalidity of touch panel function by turning on and off the hold switch, as disclosed in Japanese Patent Application Laid-Open No. 2002-268776, for example.

SUMMARY OF THE INVENTION

However, there has been an issue that, when the touch panel function is made invalid using the hold switch, user's operations are not accepted at all and this decreases the usability related to a music reproduction. Concretely, while the user is carrying the portable music player in his or her bag or pocket and listening to music, the user has to do troublesome operations if he or she desires to do an operation related to the music reproduction such as skipping ahead, pausing, and volume adjusting. In other words, the user has to take the portable music player out of the pocket and the like and operate the hold switch to make the touch panel function valid and touch the GUI button displayed on the touch panel in order to instruct the portable music player the operation related to the music reproduction.

In order to solve such an issue, the portable music player can be provided with a mechanical operation button related to a music reproduction in addition to the touch panel. With this configuration, the user can instruct an operation related to a music reproduction to the portable music player by operating the operation button related to a music reproduction without visually checking the portable music player even when the portable music player is placed in the user's pocket and the like. As a result, the user does not have to do troublesome operations such as taking out the portable music player from the pocket and the like, operating the hold switch to make touch panel function valid, and touching the GUI button displayed on the touch panel.

However, the user desires to disable the functions of the operation button related to a music reproduction in addition to the functions of the touch panel when the user is not listening to the music, for example, in order to prevent a power consumption due to malfunction. It is thus preferable that the portable music player switches the hold functions for both of the touch panel and the operation button related to a music reproduction based on how the user is using the portable music player.

However, the hold switch in related art allows the user to switch the hold status of the touch panel only so that the hold status of the operation button related to a music reproduction is switched in synchronization with the hold status of the touch panel. In other words, this causes an issue that the single hold switch does not allow the user to selectively switch the hold statuses of the touch panel and the operation button related to a music reproduction. Here, if the portable music player is provided with a switch for switching the hold status of the touch panel and a switch for switching the hold status of the operation button related to a music reproduction, this will cause an increase of the number of mechanical operation buttons provided to the device body.

The present invention has been made in view of the above issue, and it is desirable to provide a novel and improved portable information terminal, a hold status switch method and a recording medium, which are capable of enhancing the usability since a single slide switch allows a user to selectively switch hold statuses of a touch panel and an operation button related to a content reproduction.

According to an embodiment of the present invention, there is provided a portable information terminal including detecting means for detecting an operation on a display screen, a button for an operation related to a content reproduction, a changeover switch, and a control unit which switches hold statuses of the detecting means and the button according to an operation to the changeover switch.

The control unit may switch the hold statuses of the detecting means and the button to one of a first hold status which disenables functions of both the detecting means and the button, a second hold status which disenables the function of only the detecting means and a hold release status which enables functions of both the detecting means and the button, according to the operation via the changeover switch.

The changeover switch may be a slide switch that is slidable between a first position corresponding to the first hold status and a second position corresponding to the second hold status or the hold release status and may be configured to automatically returns to the second position when slid from the second position in a direction opposite to the first position, and the control unit may switch the hold status to the first hold status when the changeover switch is slid to the first position, may switch the hold status to the hold release status when the changeover switch is slid from the first position to the second position, and may switch the hold status between the hold release status and the second hold status alternatively when the changeover switch is at the second position and slid from the second position in the direction opposite to the first position.

The portable information terminal may further include another button for an operation of instructing the display to display a certain screen with respect to the display screen. The control unit may switch the hold status from the second hold status to the hold release status when an operation is input via the another button in the second hold status.

When the portable information terminal is turned off in the second hold status, the control unit may switch the hold status from the second hold status to the hold release status according to an operation of turning on the portable information terminal.

The changeover switch may be a slide switch slidable among a first position corresponding to the first hold enable status, a second position corresponding to the second hold status, and a third position corresponding to the hold release status, and the control unit may switch from the hold status to the hold release status when the changeover switch is slid to the third position, may switch the hold status to the second hold status when the changeover switch is slid to the second position, and may switch the hold status to the first hold status when the changeover switch is slid to the first position.

On the display, different images may be displayed according to the hold status.

On the display, an image, which indicates the hold status, may be slidingly displayed from the a certain position on the display as overlapping with an image previously displayed on the display.

According to another embodiment of the present invention, there is provided a hold status switch method including the steps of detecting an operation on a display screen by detecting means, reproducing a content by reproducing means based on an operation to a button, and controlling to switch hold statuses of the detecting means and the button according to an operation to a changeover switch.

According to another embodiment of the present invention, there is provided a computer-readable recording medium which stores programs to be executed by a computer, the program including the steps of detecting an operation on a display screen by detecting means, reproducing a content by reproducing means based on an operation to a button, and controlling to switch hold statuses of the detecting means and the button according to an operation to a changeover switch.

According to the embodiments of the present invention described above, the single slide switch allows selectively switching the hold statuses of the touch panel and the operation button related to a content reproduction and this can enhance the usability.

BRIEF DESCRIPTION OF THE DRAWINGS

FIG. 18 is an explanatory diagram showing an example of a hardware configuration of the portable music player 100 according to an embodiment of the present invention.

DETAILED DESCRIPTION OF THE EMBODIMENTS

Figure 1:
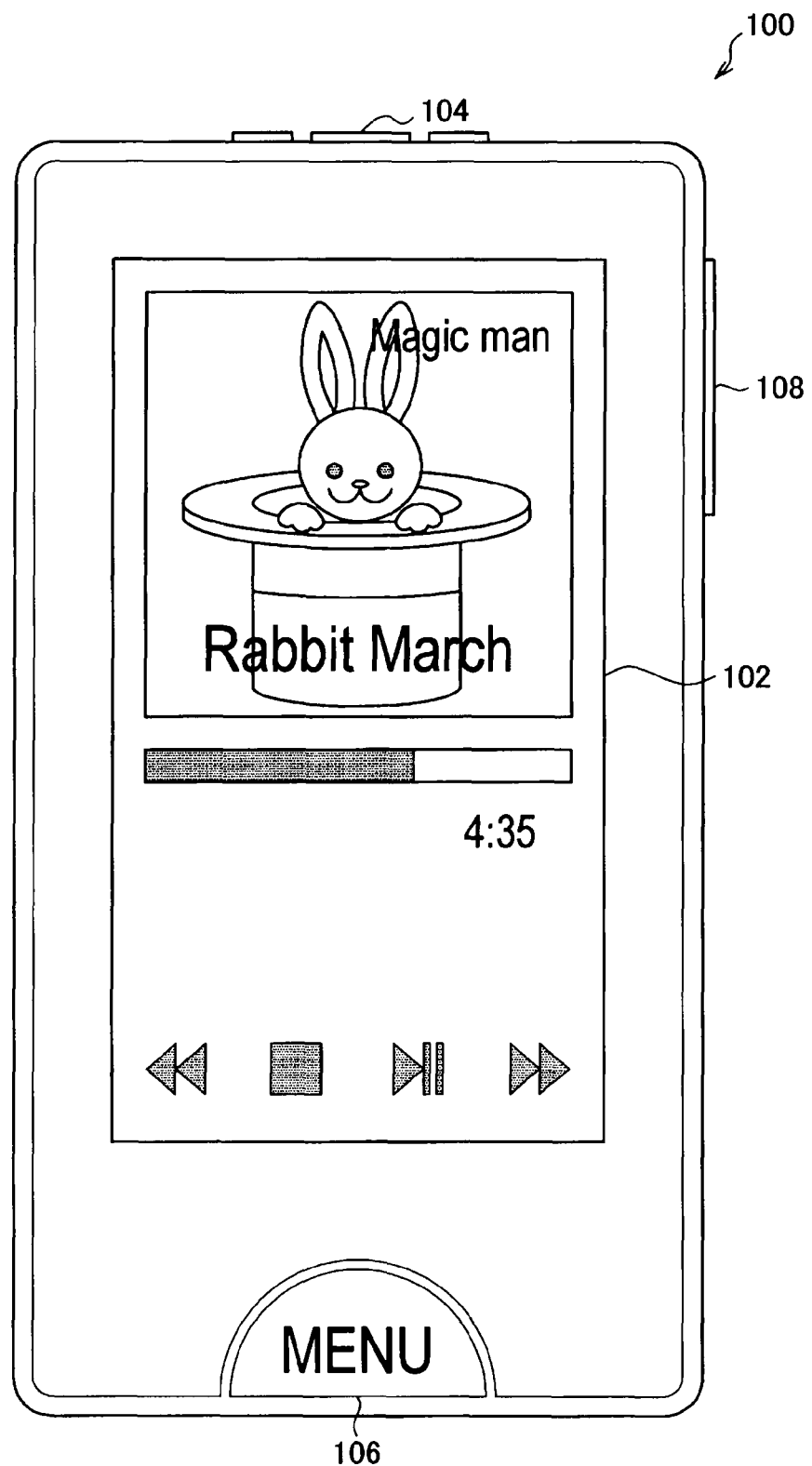
FIG. 1 is an explanatory diagram showing an example of an external front view of a portable music player 100 according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted. Further, the explanation will be described in following order:

1. An outline of an embodiment of the present invention
2. An external appearance of a portable music player 100 according an embodiment
3. A functional configuration of the portable music player 100
4. A concept of hold status
5. A process of switching the hold function in the portable music player 100
6. Modification examples
6-1. First modification example (a modification example of a hold status changeover switch)
6-2. Second modification example (a modification example of an automatic hold status switching using the touch panel display button)
6-3. Third modification example (a modification example of an automatic hold status switching at restarting the power supply)
6-4. Fourth modification example (a modification example of a hold status display)
7. A hardware configuration of portable music player 100
8. Conclusion

1. AN OUTLINE OF AN EMBODIMENT OF THE PRESENT INVENTION

For the purpose of detailed explanation of a portable information terminal according to an embodiment of the present invention, an outline of the embodiment will be described, compared with a related art. In the following description, a portable music player will be described as an example of the portable information terminal; however the portable information terminal can be a portable phone, a PDA, a portable game machine, a digital camera or a digital video camera, for example. In other words, the portable information terminal according to the embodiment of the present invention can include any functions in addition to a touch panel function and a function to reproduce a certain content.

As described above, a portable music player, which is multifunctional in these days, often has a touch panel function to display various operation buttons as GUI buttons on a display and accept user's operations. This type of portable music player is generally provided with a hold switch on the device body and has a hold function to switch validity of the touch panel function according to an ON or OFF state of the hold switch.

However, when the touch panel function is disabled by operating the hold switch, any user's operation is not accepted at all and it has been an issue that the usability regarding a music reproduction is insufficient. More specifically, while a user is listening to music with a portable music player, which is put in a bag or a pocket, the user often has to do troublesome operations to execute operations related to a music reproduction such as skipping ahead, pausing, and volume adjusting. In other words, the user has to take the portable music player out of the pocket and the like, and enable the touch panel function by operating the hold switch before touching the GUI buttons displayed on the touch panel in order to instruct the portable music player the operations related to a music reproduction.

In order to solve such an issue, some portable music players include mechanical operation buttons related to a music reproduction in addition to the touch panel. According to those portable music players, a user can operate the operation buttons related to a music reproduction over the pocket without visually checking the portable music player. With this configuration, the user can instruct the portable music player operations related to a music reproduction even when the portable music player is kept in a pocket, for example. As a result, the user does not have to execute troublesome operations such as taking the portable music player out of the pocket and the like, enabling the touch panel function by operating the hold switch, and touching the GUI buttons displayed on the touch panel.

However, the user desires to disable the operation buttons related to music reproduction in addition to the touch panel when the user does not use the portable music player to listen to the music for example, in order to prevent power consumption due to a malfunction. In contrast, the user desires to enable both of the touch panel and operation buttons related to a music reproduction when the user executes a certain operation on the touch panel. In this point of view, it is preferable that the portable music player has a function so that the hold status of the touch panel and the hold status of the operation buttons related to a music reproduction can be selectively switched according to usage conditions.

However, according to the hold switch of the portable music player in the past, only the hold status of the touch panel can be switched and the hold status of the operation buttons related to a music reproduction is switched in synchronization with the hold status of the touch panel. This causes an issue of insufficient usability because the user is not allowed to selectively switch the hold statuses to disenable only the touch panel and enable the operation buttons related to a music reproduction. Here, it is considerable that a switch to change the hold status of the touch panel and a switch to change the hold status of the operation buttons related to a music reproduction are respectively provided to the portable music player. However, this causes an issue that the number of mechanical operation buttons provided to the device itself increases.

A portable music player according to the embodiment of the present invention is made to solve such issues. In other words, the portable music player according to the embodiment of the present invention can improve the usability since the hold statuses of the touch panel and the operation buttons related to a content reproduction can be selectively switched by using a single slide switch.

More specifically, the portable music player according to the embodiment of the present invention has a single hold switch for selectively switching the hold status of the touch panel and the hold status of the operation buttons related to the music reproduction. With this configuration, for example, a user can selectively switch among three hold statuses provided to the portable music player by operating the single hold switch. A first hold status is, for example, a hold enable status in which all functions of the touch panel and the operation button related to a music reproduction are disabled. A second hold status is, for example, a touch panel hold status in which only the functions of the touch panel are disabled and the functions of the operation button related to a music reproduction are enabled. Further, a third hold status is, for example, a hold release status in which the all functions of the touch panel and the operation button related to a music reproduction are enabled.

The hold switch provided to the portable music player according to the present embodiment is composed of a slide-type switch having set positions corresponding to the above three hold statuses. With this configuration, a user can arbitrarily select a desired hold status by sliding the hold switch to one of the positions corresponding to the respective hold statuses.

Further, the hold switch can have a configuration in which a spring mechanism is provided so that the switch automatically returns to a predetermined set position after the switch is slid. With this configuration, the user can sequentially switch the plurality of hold functions by temporarily sliding the hold switch in one direction. In this case, the portable music player can switch the hold status by detecting a temporal slide operation by the user with an inner circuit structure and the like while keeping the hold switch at a certain position. Thus, the portable music player can automatically switch the hold status in response to a certain process execution or a restarting the power supply, for example, other than the user's operation of the slide switch.

As described above, in the portable music player according to the present embodiment, the hold statuses of the touch panel and the operation buttons related to a content reproductions can be selectively switched using the single slide switch. This can improve the usability of the portable music player. Hereinafter, the portable music player according to the embodiment of the present invention, which has the above characteristics, will be described in detail.

2. AN EXTERNAL APPEARANCE OF A PORTABLE MUSIC PLAYER 100 ACCORDING AN EMBODIMENT

Figure 2:
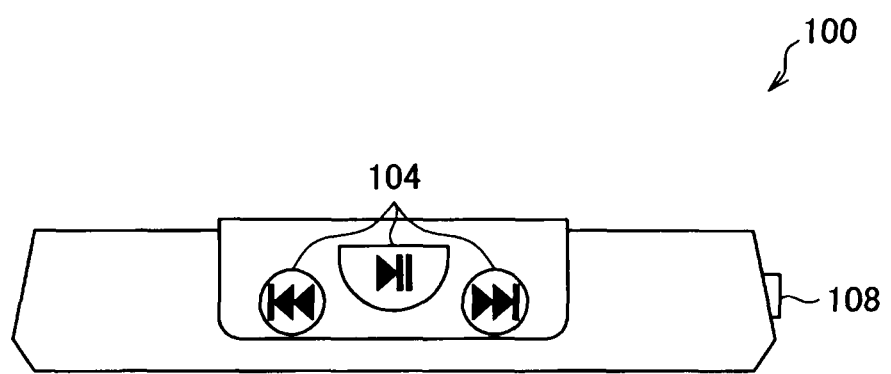
FIG. 2 is an explanatory diagram showing an example of an external top view of the portable music player 100 according to the embodiment.
Figure 3:
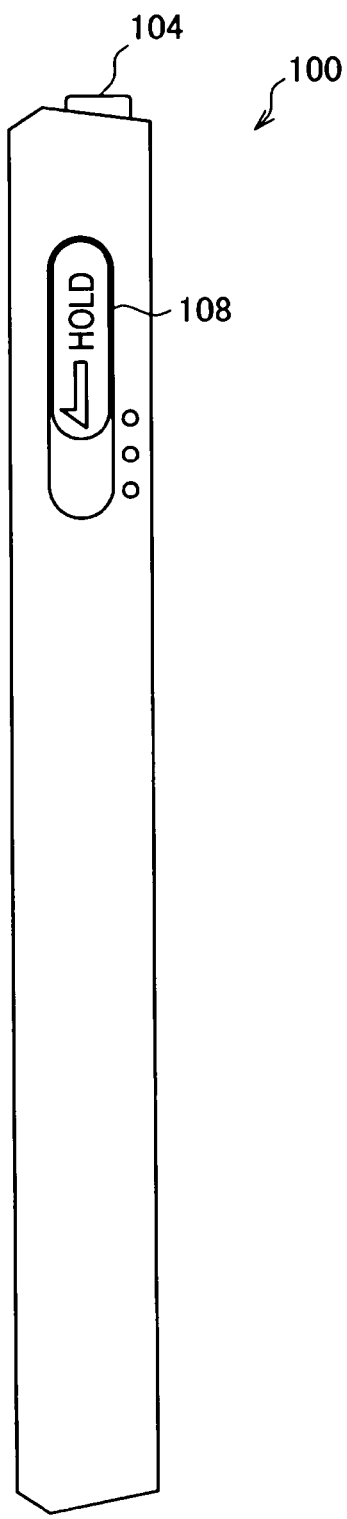
FIG. 3 is an explanatory diagram showing an example of an external top view of the portable music player 100 according to the embodiment.

Firstly, an appearance of a portable music player 100 according to the present embodiment will be described. FIG. 1 is an explanatory diagram showing an example of an external front view of the portable music player 100 according to the present embodiment. FIG. 2 is an explanatory diagram showing an example of an external top view of the portable music player 100 according to the present embodiment. FIG. 3 is an explanatory diagram showing an example of an external side view of the portable music player 100 according to the present embodiment.

As shown in FIG. 1, the portable music player 100 according to the present embodiment mainly includes a touch panel 102, a content control button 104, a touch panel display button 106 and a hold status changeover switch 108.

The touch panel 102 can display, for example, GUI (Graphical User Interface) buttons corresponding to certain functions of the portable music player 100 in addition to information of currently reproducing music, still images, moving images and the like. The portable music player 100 detects a user's pressing on the touch panel 102, thereby recognizing that a displayed GUI button is selected and executing a certain process corresponding to the GUI button selected by the user.

The touch panel 102 is composed of, for example, an LCD (Liquid Crystal Display) device displaying an image or the GUI buttons, a backlight of the LDC device, and a detecting device detecting a user's pressing. The touch panel 102 is configured to display the GUI buttons corresponding to certain functions and is not limited to a specific display device or a specific touching detecting method as long as user's pressing on the GUI button is detected.

The content control button 104 is an operation button to receive an instruction, from a user, related to a reproduction of a content which is reproducible by the portable music player 100. The content, which is reproducible by the portable music player 100, is, for example a music file, a movie file and a still image file. The content control button 104 is composed of, for example, a play/pause button, a skip ahead button and a skip back button, as shown in FIG. 2.

The user can instruct a desired process related to a content reproduction such as reproducing a content, pausing, skipping ahead and skipping back to the portable music player 100 by operating the content control button 104. The portable music player 100 can execute a certain process related to a content reproduction in response to a user's instruction via the content control button 104. As described above, the portable music player 100 according to the present embodiment is provided with the separate and independent content control button 104 and touch panel 102. Thus, even when the portable music player 100 is placed in a pocket and the like, the user can instruct a certain instruction related to a content reproduction to the portable music player 100 by operating the content control button 104 without visually checking the portable music player 100. Further, the user can arbitrarily switch the hold statuses of the touch panel 102 and the content control button 104 as described below in detail.

The touch panel display button 106 is an operation button to accept a user's instruction related to displaying a predetermined screen on the touch panel 102. The predetermined screen to be displayed on the touch panel 102 is, for example, a menu screen to display various functions included in the portable music player 100 such as reproducing a content, editing content information, changing reproduce mode, changing tones and initializing.

The user can instruct the portable music player 100 to display a menu screen on the touch panel by pressing the touch panel display button 106. The portable music player 100 can display the menu screen on the touch panel 102 in response to the user's instruction via the touch panel display button 106. With this configuration, the user can instruct a desired process to the portable music player 100 by selecting a GUI button included in the menu screen displayed on the touch panel 102.

The hold status changeover switch 108 is a slide switch to accept a user's instruction related to switching the hold statuses of the touch panel 102 and the content control button 104. As described above, the portable music player 100 according to the present embodiment has three hold statuses including a hold release status, a touch panel hold status and a hold enable status. Thus, the hold status changeover switch 108 is configured to be slidable to positions corresponding to the three hold statuses as an example shown in FIG. 3.

The user can instruct the portable music player 100 to switch the hold status by sliding the hold status changeover switch 108 to a position corresponding to a desired hold status. The portable music player 100 can switch the hold status according to a result of detecting the position of the hold status changeover switch 108. The process of switching the hold statuses by the hold status changeover switch 108 will be described in later described process flows.

Figure 4:
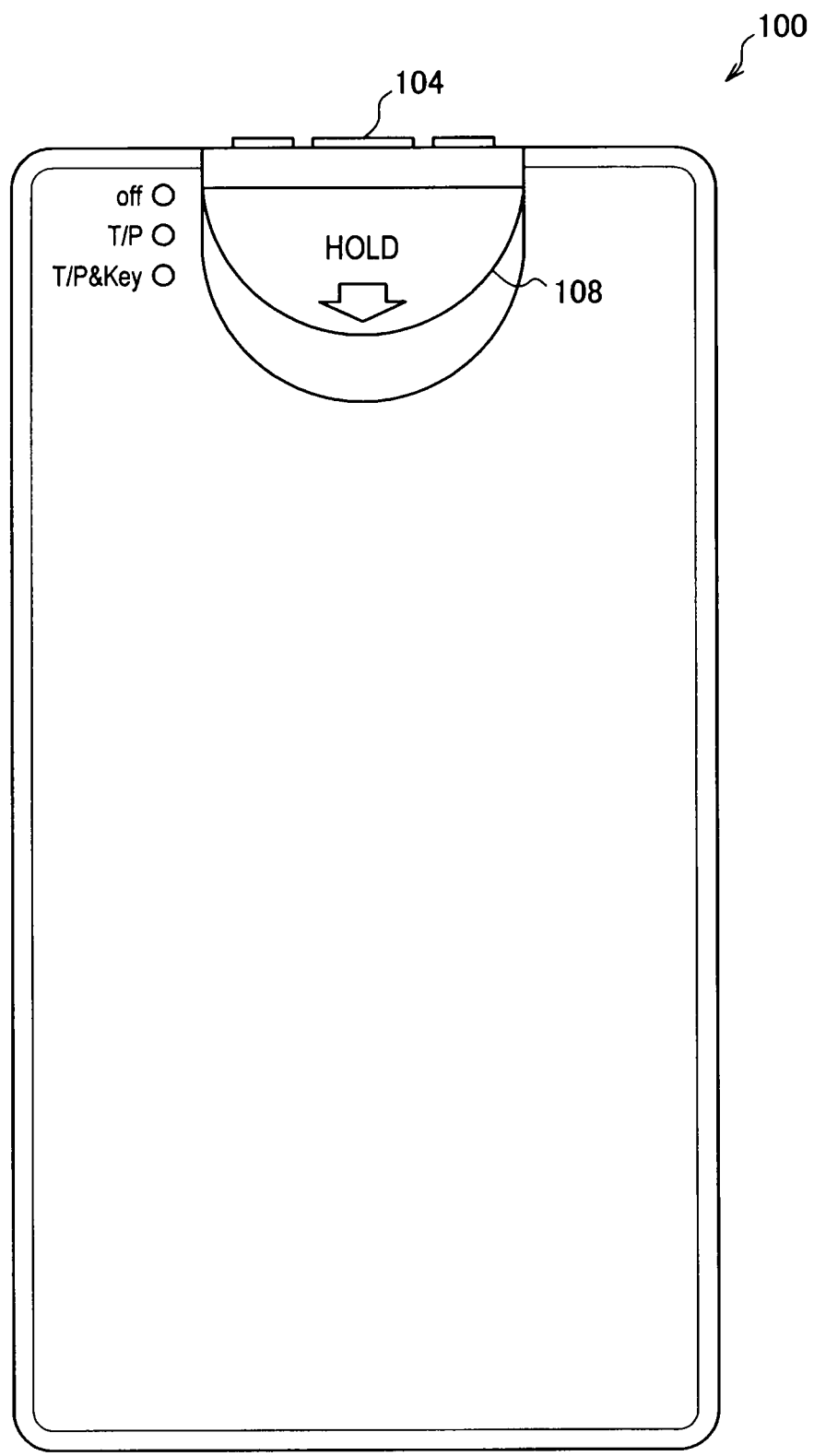
FIG. 4 is an explanatory diagram showing an example of an external top view of the portable music player 100 according to the embodiment.

The exterior configuration of the portable music player 100 according to the present embodiment has been described. The exterior views shown in FIGS. 1 to 3 are examples of the exterior configuration of the portable music player 100 and the present invention should not be limited to the examples. For example, the touch panel 102 of FIG. 1, the positions of the buttons and the type of the content control button 104 are not limited to the examples shown in FIGS. 1 to 3. For example, the content control button 104 can include a stop button, a frame advance button, a volume adjustment button and the like, in addition to the example shown in FIG. 2. Further, the hold status changeover switch 108 is not limited to be provided on the side of the portable music player 100 as shown in the example of FIG. 3 but can be provided on the back of the portable music player 100 as shown in FIG. 4, for example.

3. A FUNCTIONAL CONFIGURATION OF THE PORTABLE MUSIC PLAYER 100

Figure 5:
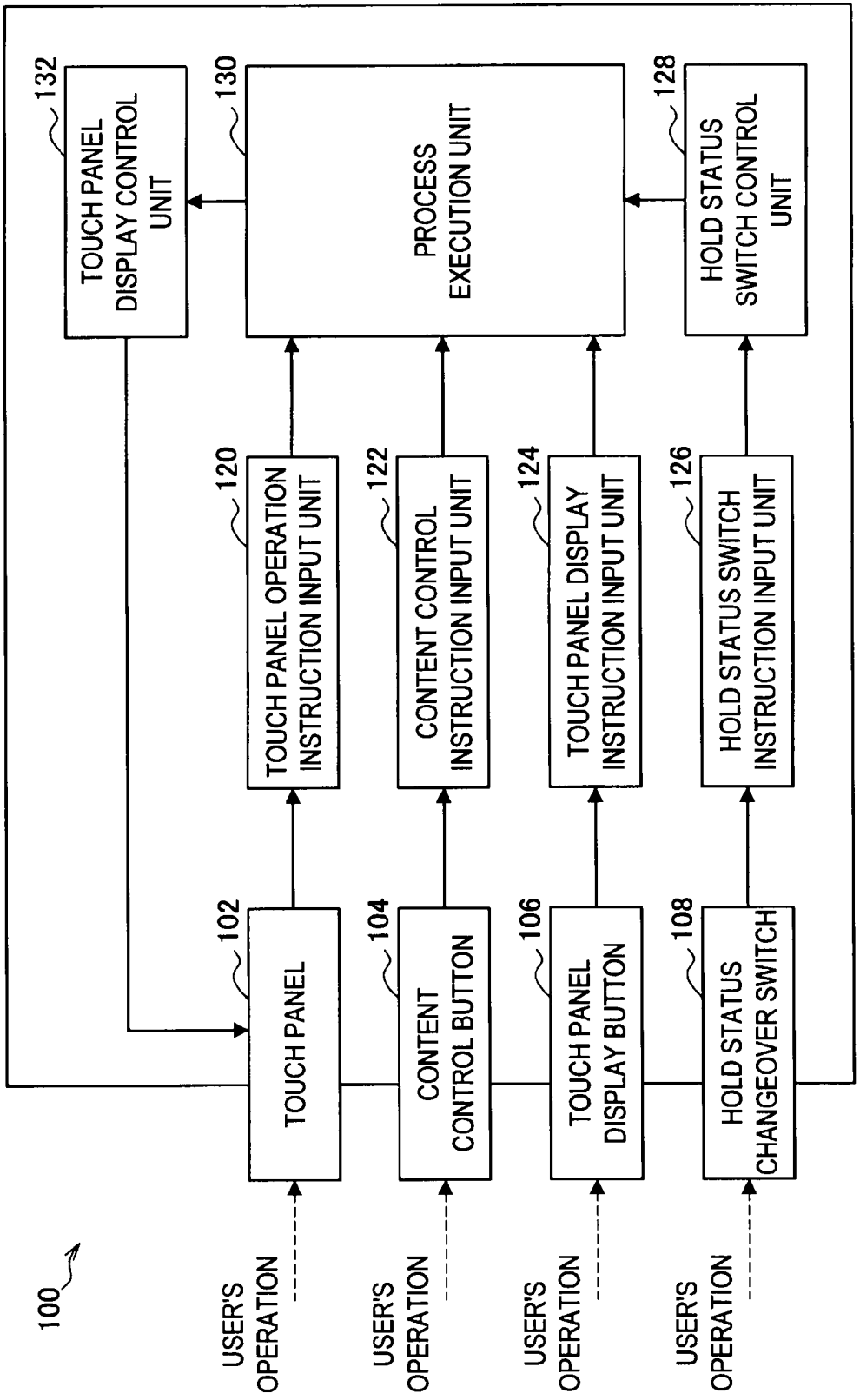
FIG. 5 is a block diagram showing an example of a functional configuration of the portable music player 100 according to the embodiment.

The functional configuration of the portable music player 100 having the touch panel 102, content control button 104, touch panel display button 106 and hold status changeover switch 108 will be described. FIG. 5 is a block diagram showing a functional configuration of the portable music player 100 according to the present embodiment.

As shown in FIG. 5, the portable music player 100 mainly includes a touch panel operation instruction input unit 120, a content control instruction input unit 122, a touch panel display instruction input unit 124, a hold status switch instruction input unit 126, a hold status switch control unit 128, a process execution unit 130 and a touch panel display control unit 132.

The functional units constituting the portable music player 100 execute various functions as being controlled by the CPU (Central Processing Unit). The functional configuration of the portable music player 100 shown in FIG. 5 is an example to explain the present embodiment and the present invention should not be limited to this example. In other words, it should be appreciated that the portable music player 100 can include various functions included in a normal information processing terminal, such as a photographing function, a communicating function, an image editing function, an audio input and output function and an external input and output function, for example, in addition to the functional configurations shown in FIG. 5. In the following explanation, the details of the respective functional units shown in FIG. 5 will be described, focusing on the process for switching the hold statuses of the touch panel 102 and the content control button 104, which is a characteristic of the present embodiment.

(Touch Panel Operation Instruction Input Unit 120)

The touch panel operation instruction input unit 120 sends a signal to the process execution unit 130 to instruct an execution of a certain process, in response to a user's operation on the touch panel 102. As described above, the touch panel 102 can display the GUI buttons, which correspond to predetermined functions included in the portable music player 100, on a display. Further, the touch panel 102 can detect a user's pressing when the user touches the GUI button. The signal including the information related to the detected user's operation is sent from the touch panel 102 to the touch panel operation instruction input unit 120. Based on the signal sent from the touch panel 102, the touch panel operation instruction input unit 120 determines which GUI button shown on the touch panel 102 is selected by the user and sends a signal to the process execution unit 130 to instruct an execution of a process corresponding to the GUI button selected by the user. Upon receiving the signal, the process execution unit 130 can execute a process of the function corresponding to the GUI button selected by the user among the GUI buttons displayed on the touch panel 102.

(Content Control Instruction Input Unit 122)

The content control instruction input unit 122 sends a signal to the process execution unit 130 to instruct an execution of a certain process related to a content reproduction, in response to the user's operation via the content control button 104. As described above, the user can instruct various processes related to a content reproduction to the portable music player 100 by operating the content control button 104. Thus, upon determining that the content control button 104 is pressed by the user, the content control instruction input unit 122 sends a signal to the process execution unit 130 to instruct an execution of a process corresponding to the content control button 104 pressed by the user. Upon receiving the signal, the process execution unit 130 can execute the process of a function related to a content reproduction, corresponding to the content control button 104 operated by the user.

Here, whether or not the content control button 104 is pressed by the user can be detected by, for example, a contact point type unit or a detection sensor; however, the detection method is not limited to a specific detection unit as long as the user's operations of the buttons can be detected.

(Touch Panel Display Instruction Input Unit 124)

The touch panel display instruction input unit 124 sends a signal to the process execution unit 130 to instruct an execution of a process of displaying a previously set screen on the touch panel 102, in response to the user's operation of the touch panel display button 106. As described above, the user can instruct the portable music player 100 to display a previously set screen such as a menu screen on the touch panel 102 by pressing the touch panel display button 106. Thus, upon determining that the touch panel display button 106 is pressed by the user, the touch panel display instruction input unit 124 sends a signal to the process execution unit 130 to instruct to display a screen such as a menu screen on the touch panel 102. Upon receiving the signal, the process execution unit 130 can display a previously set screen such as a menu screen on the touch panel 102 via the later described touch panel display control unit 132.

(Hold Status Switch Instruction Input Unit 126)

The hold status switch instruction input unit 126 detects user's sliding operation of the hold status changeover switch 108 and sends a detected result to the hold status switch control unit 128. As described above, the hold status changeover switch 108 is configured to be slidable among the set positions corresponding to the three hold statuses: hold release status, touch panel hold status and hold enable status. With this configuration, the user can arbitrarily switch among the three hold statuses by slidingly operating the hold status changeover switch 108. Thus, the hold status switch instruction input unit 126 periodically detects the position of the hold status changeover switch 108 and, when the position of the hold status changeover switch 108 is changed, sends information related to changed position to the hold status switch control unit 128.

(Hold Status Switch Control Unit 128)

Based on the signal sent from the hold status switch instruction input unit 126, the hold status switch control unit 128 sends a signal to the process execution unit 130 to instruct to switch the hold status of the portable music player 100. As described above, when the position of the hold status changeover switch 108 is changed, the hold status switch control unit 128 receives information related to the changed position of the hold status changeover switch 108 from the hold status switch instruction input unit 126. Upon receiving the information, the hold status switch control unit 128 sends a signal to the process execution unit 130 to instruct to switch to the hold status corresponding to the changed position of the hold status changeover switch 108.

For example, when the hold status changeover switch 108 is moved to a position corresponding to the hold release status, the hold status switch control unit 128 sends a signal to the process execution unit 130 to instruct to change to the hold release status. When the hold status changeover switch 108 is moved to a position corresponding to the touch panel hold status, the hold status switch control unit 128 sends a signal to the process execution unit 130 to instruct to change to the touch panel hold status. Further, when the hold status changeover switch 108 is moved to a position corresponding to the hold enable status, the hold status switch control unit 128 sends a signal to the process execution unit 130 to instruct to change to the hold enable status.

(Process Execution Unit 130)

The process execution unit 130 executes various functions included in the portable music player 100 base on the signals sent from the respective instruction input units 120, 122 and 124. For example, based on the signal sent from the touch panel operation instruction input unit 120, the process execution unit 130 executes a function corresponding to the GUI button selected by the user by operating the touch panel 102. Based on the signal sent from the content control instruction input unit 122, the process execution unit 130 executes a process related to a content reproduction corresponding to the content control button 104 pressed by the user. Based on the signal sent from the touch panel display instruction input unit 124, the process execution unit 130 executes a process to display a previously set menu screen and the like on the touch panel 102.

Further, based on the signal sent from the hold status switch control unit 128, the process execution unit 130 executes a process to switch the hold status of the portable music player 100. For example, when a signal instructing to change to the hold release status is received from the hold status switch control unit 128, the process execution unit 130 switches the hold status of the portable music player 100 to the hold release status. In a case of this hold release status, when signals are received from the touch panel operation instruction input unit 120 and the content control instruction input unit 122, the process execution unit 130 executes a process corresponding to the received signals.

On the other hand, when a signal instructing to change to the touch panel hold status is received from the hold status switch control unit 128, the process execution unit 130 switches the hold status of the portable music player 100 to the touch panel hold status. In a case of this touch panel hold status, the process execution unit 130 does not respond to signals sent from the touch panel operation instruction input unit 120 and responds to only the signals sent from the content control instruction input unit 122.

Further, when a signal instructing to change to the hold enable status is received from the hold status switch control unit 128, the process execution unit 130 switches the hold status of the portable music player 100 to hold enable status. In a case if this hold enable status, the process execution unit 130 dose not respond to signals sent from the touch panel operation instruction input unit 120 and the content control instruction input unit 122 at all. The details of the process of switching the hold status by the process execution unit 130 and the various processes corresponding to user's operations using the touch panel 102 and the content control button 104 will be described in the following process flows.

When the display screen of the touch panel 102 is changed corresponding to a process to be executed, the process execution unit 130 sends a signal to the later described touch panel display control unit 132 to instruct to change the display screen of the touch panel 102. Upon receiving the signal, the touch panel display control unit 132 can update the display screen of the touch panel 102 corresponding to the process executed by the process execution unit 130.

(Touch Panel Display Control Unit 132)

The touch panel display control unit 132 executes a process of switching the display of the touch panel 102 based on the signal sent from the process execution unit 130. For example, when the user presses the touch panel display button 106, the touch panel display control unit 132 can display a menu screen on the touch panel 102 based on the signal sent via the touch panel display instruction input unit 124 and the process execution unit 130. After that, when the user selects a certain GUI button on the menu screen, information related to the selected GUI button is sent to the touch panel display control unit 132 via the touch panel operation instruction input unit 120 and the process execution unit 130. Based on the signal, the touch panel display control unit 132 can display new GUI buttons related to the selected GUI button on the touch panel 102. Further, when any hold statuses is selected by the user, the touch panel display control unit 132 can display a mark, an image and the like on the touch panel 102 to show the current hold status to the user. An example of changed display on the touch panel 102 when the hold status is switched will be described in a later described fourth modification example.

The touch panel display control unit 132 can appropriately update the display screen on the touch panel 102 corresponding to an instruction from the process execution unit 130 and the screen content to be updated is not limited to the above examples. It is noted that the touch panel display control unit 132 is able to automatically switch the display on the touch panel 102 without an instruction from the user, in case of an update of play time display regarding music being reproduced or a slide show of still image files, for example.

An example of the functional configuration of the portable music player 100 according to the present embodiment has been described with reference to FIG. 5. Here, the functional configuration of the portable music player 100 shown in FIG. 5 is an example to describe the present embodiment and the above description is focused on the function related to switching of hold statuses, which is a characteristic of the present embodiment.

4. A CONCEPT OF HOLD STATUS

Figures 6, 7:
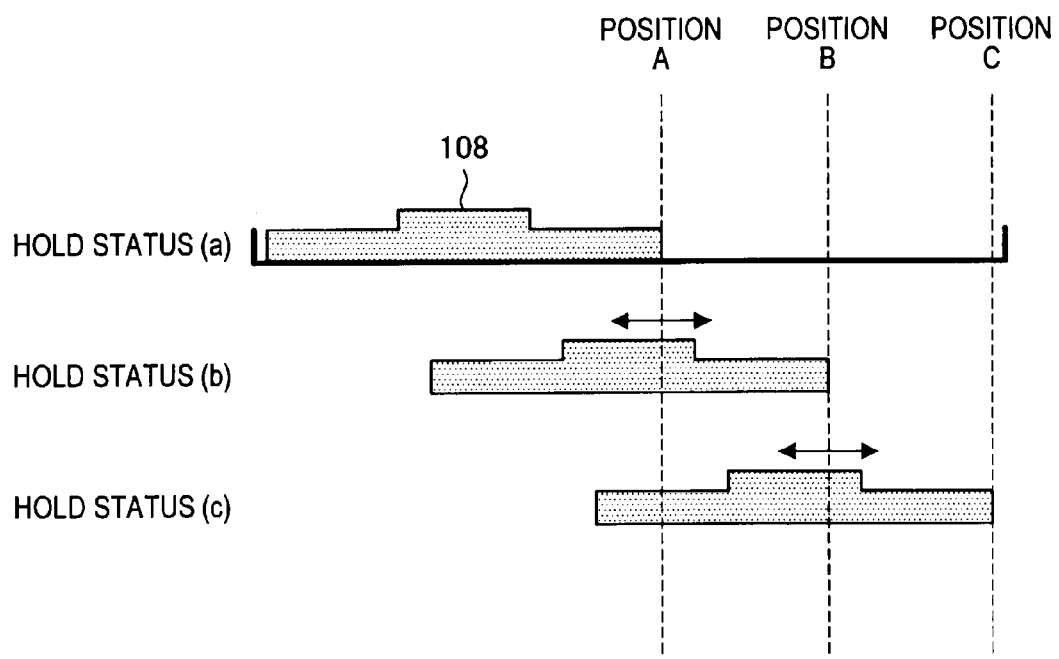
FIG. 6 is a conceptual diagram showing a relationship between positions when a hold status changeover switch 108 is slid and hold statuses corresponding to the positions according to the embodiment.
FIG. 7 is an explanatory diagram showing a relationship of validity and invalidity of a function of a touch panel 102 and a function of a content control button 104 in the respective hold statuses according to the embodiment.

A concept of the three hold statuses of the portable music player 100 according to the present embodiment will be described. FIG. 6 is a conceptual diagram of a relationship between the positions of the slid hold status changeover switch 108 and the hold statuses corresponding to the positions. FIG. 7 is an explanatory diagram showing the validity and invalidity of the functions of the touch panel 102 and the content control button 104 in the respective hold statuses. Here, the "ON" in FIG. 7 indicates that the hold function is valid so that the functions of the touch panel 102 or the content control button 104 are invalid. The "OFF" in FIG. 7 indicates that the hold function is invalid and the functions of the touch panel 102 or the content control button 104 are valid.

As shown in FIG. 6, the hold status changeover switch 108 is slidable among a position A (first switching position), a position B (second switching position) and a position C (third switching position), which correspond to the three hold statuses (a), (b) and (c) respectively. Thus, the user can switch to the hold status (a) by sliding the hold status changeover switch 108 to the position A, to the hold status (b) by sliding the hold status changeover switch 108 to the position B, and to the hold status (c) by sliding the hold status changeover switch 108 to the position C.

Referring to FIG. 7, the hold status (a) corresponds to the "hold release status," in which the functions of both the touch panel 102 and the content control button 104 are valid. The hold status (b) corresponds to the "touch panel hold status," in which the only the functions of the touch panel 102 is invalid and the functions of the content control button 104 are valid. Further, the hold status (c) corresponds to the "hold enable status," in which the functions of both the touch panel 102 and the content control button 104 are invalid.

In other words, the user can selectively switch among the hold release status, touch panel hold status and hold enable status by sliding the hold status changeover switch 108 to the positions A, B, and C.

5. A PROCESS OF SWITCHING THE HOLD FUNCTION IN THE PORTABLE MUSIC PLAYER 100

A flow of various processes executed by the portable music player 100 according to the present embodiment will be described with reference to the flowcharts.

(A Process of Switching the Hold Status)

Figure 8:
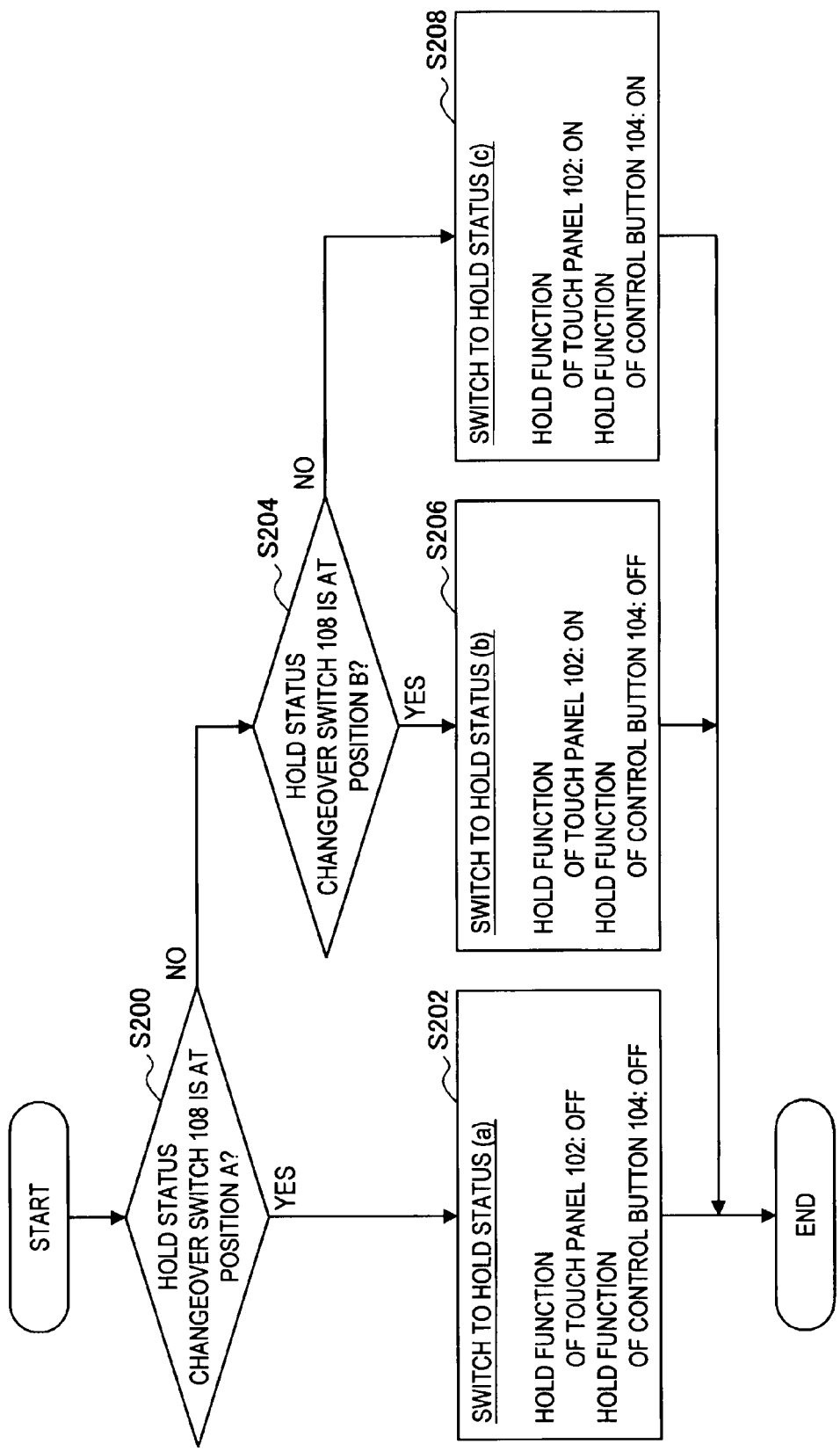
FIG. 8 is a flowchart showing an example of a process for switching the hold status when a user operates the hold status changeover switch 108, according to the embodiment.

A flow of a process of switching hold status in response to a user's operation of the hold status changeover switch 108 will be described. FIG. 8 is a flowchart showing an example of a process of switching hold status in response to a user's operation of the hold status changeover switch 108. The process shown in FIG. 8 is a process in a case where a user changes the position of the hold status changeover switch 108, that is, where a signal including information related to a changed position is sent from the hold status switch instruction input unit 126 to the hold status switch control unit 128.

As shown in FIG. 8, in step 200, the hold status switch control unit 128 determines whether or not the hold status changeover switch 108, which is moved by the user, is set at the position A. As described above, the hold status switch control unit 128 can recognize the position of the hold status changeover switch 108 based on the signal sent from the hold status switch instruction input unit 126.

When it is determined that the hold status changeover switch 108 is set at the position A in step 200, the process execution unit 130 executes a process of switching to the hold status (a) in response to the instruction from the hold status switch control unit 128 in step 202. In other words, the process execution unit 130 switches the hold status to the hold release status by turning off the hold functions of the touch panel 102 and the content control button 104. As a result, the process execution unit 130 executes predetermined processes in response to user's operations via the touch panel 102 and the content control button 104. In other words, the user is allowed to operate both of the touch panel 102 and the content control button 104. The user thus can execute certain operations such as selecting a menu and selecting music by operating the touch panel 102. Further, the user can operate the content control button 104 to execute a process related to the music being reproduced (such as pausing and skipping ahead) while operating menu screen shown on the touch panel 102.

On the other hand, when it is determined that the hold status changeover switch 108 is not set at the position A in step 200, the hold status switch control unit 128 determines whether the hold status changeover switch 108, which is moved by the user, is set at position B in step 204.

When it is determined that the hold status changeover switch 108 is set at the position B in step 204, the process execution unit 130 executes a process of switching to the hold status (b) in response to an instruction from the hold status switch control unit 128 in step 206. In other words, the process execution unit 130 switches the hold status to the touch panel hold status by turning on the hold function of the touch panel 102 and turning off the hold function of the content control button 104. As a result, the process execution unit 130 does not execute processes according to the user's operations via the touch panel 102 at all and executes only certain processes corresponding to the user's operations via the content control button 104. In other words, the user is not allowed to operate via the touch panel 102 but is allowed to operate via only the content control button 104. This can surely prevent malfunctions via the touch panel 102 even when the user carries the portable music player 100 in a pocket, for example, and listens to the music. Further, the user can execute only operations related to a content reproduction by operating the content control button 104 without visually checking the portable music player 100.

When it is determined that the hold status changeover switch 108 is not set at the position B in step 204, the hold status switch control unit 128 determines that the hold status changeover switch 108, which is moved by the user, is set at the position C. In this case, in step 208, the process execution unit 130 executes a process of switching to the hold status (c) according to the instruction from the hold status switch control unit 128. In other words, the process execution unit 130 switches the hold status to the hold enable status by turning on the hold functions of the touch panel 102 and the content control button 104. As a result, the process execution unit 130 does not execute processes in response to user's operations via the touch panel 102 and the content control button 104 at all. In other words, the user is not allowed to operate the touch panel 102 and the content control button 104. This can surely prevent malfunctions via the touch panel 102 and the content control button 104 while the user is not using the portable music player 100, for example.

(A Process when the Touch Panel 102 is Operated)

Figure 9:
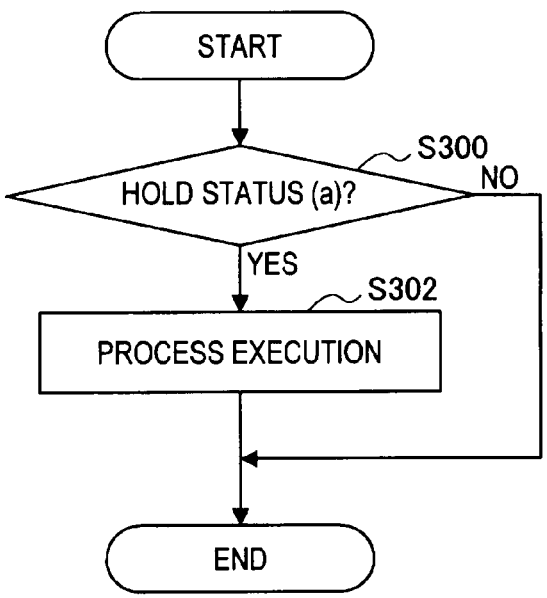
FIG. 9 is a flowchart showing an example of a process when the user touches a certain GUI button displayed on the touch panel 102, according to the embodiment.

A process flow when the user touches a certain GUI button displayed on the touch panel 102 will be described. FIG. 9 is a flowchart of a process when the user touches a certain GUI button displayed on the touch panel 102. The process shown in FIG. 9 is a process when the user touches a GUI button shown on the touch panel 102, that is, when a signal including information related to touch panel operation is sent from the touch panel operation instruction input unit 120 to the process execution unit 130.

As shown in FIG. 9, in step 300, the process execution unit 130 determines whether the current hold status is the hold status (a), that is, the hold release status. The process execution unit 130 can record the current hold status to a temporary storage area such a as RAM (Random Access Memory) when the hold status is changed by the process flow shown in FIG. 8. With such a configuration, the process execution unit 130 is able to confirm the current hold status when a signal is received from the touch panel operation instruction input unit 120.

When it is determined that the current hold status is the hold status (a) in step 300, the process execution unit 130 executes a certain process based on the signal sent from the touch panel operation instruction input unit 120 in step 302.

On the other hand, when it is determined that the current hold status is not the hold status (a) in step 300, this means that the hold status is the touch panel hold status (hold status (b)) or the hold enable status (touch panel hold status (c)). Thus, since the functions of at least the touch panel 102 should be disabled in the portable music player 100, the process execution unit 130 does not execute processes in response to signals sent from the touch panel operation instruction input unit 120 at all.

In such a manner, the process execution unit 130 can disable the user's operation on the touch panel 102 or execute a process corresponding to the user's operation on the touch panel 102, according to the hold status of the portable music player 100.

(A Process when the Content Control Button 104 is Operated)

Figure 10:
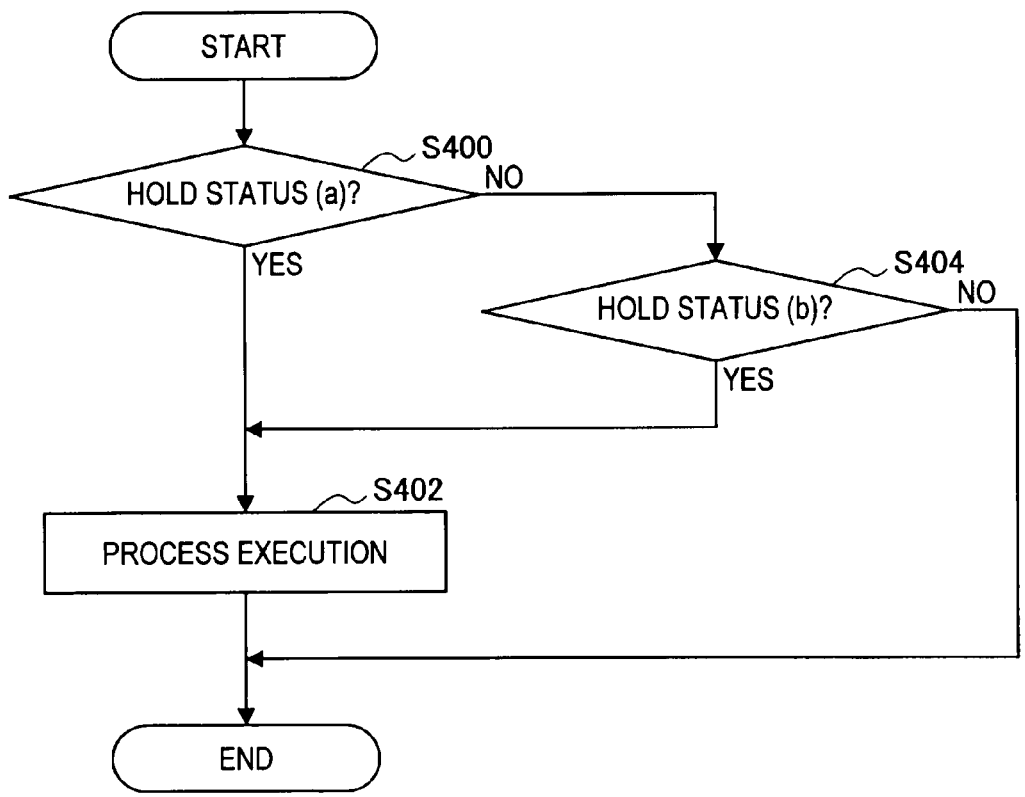
FIG. 10 is a flowchart showing an example of a process when the user presses the content control button 104, according to the embodiment.

A process flow when the user presses the content control button 104 will be described. FIG. 10 is a flowchart of a process when the user presses the content control button 104. Here, the process shown in FIG. 10 is a process when the user presses the content control button 104, that is, when a signal including information related to a content reproduction is sent from the content control instruction input unit 122 to the process execution unit 130.

As shown in FIG. 10, in step 400, the process execution unit 130 determines whether the current hold status is the hold status (a), that is, the hold release status.

When it is determined that the current hold status is the hold status (a) in step 400, the process execution unit 130 executes a certain process based on a signal sent from the content control instruction input unit 122 in step 402.

On the other hand, when it is determined that the current hold status is not the hold status (a) in step 400, the process execution unit 130 determines whether the current hold status is the hold status (b), that is, the touch panel hold status, in step 404.

When it is determined that the current status is the hold status (b) in step 404, the process execution unit 130 executes a certain process based on a signal sent from the content control instruction input unit 122 in step 402.

On the other hand, when it is determined that the current status is not the hold status (b) in step 404, it means that the hold status is the hold enable status (touch panel hold status (c)). Since the functions of the content control button 104 should be disabled in the portable music player 100, the process execution unit 130 does not execute a process based on signals sent from the content control instruction input unit 122 at all.

In this manner, the process execution unit 130 is configured to disable the user's operation of the content control button 104 or execute a process corresponding to the user's operation via the content control button 104, according to the hold status of the portable music player 100.

The portable music player 100 according to the present embodiment has been described in detail. As described above, the portable music player 100 allows selectively switching the hold statuses of the touch panel 102 and the content control button 104 using the single hold status changeover switch 108 and this can improve the usability of the portable music player 100.

6. MODIFICATION EXAMPLES

The functions included in the portable music player 100 according to the above embodiment should not be limited to the above examples and additional functions can be further included or a part of the above functions can be modified in order to further improve the usability of the portable music player 100. Hereinafter, modification examples of the portable music player 100, which can further improve its usability, will be described.

6-1. First Modification Example

In the above embodiment, the hold status changeover switch 108 is configured to be slidable in a graduated manner among three positions. With this configuration, the user can selectively switch the hold status corresponding to the respective positions by sliding the hold status changeover switch 108 to the respective positions. However, the configuration of the hold status changeover switch 108 is not limited to the above examples. Hereinafter, as a first modification example, the portable music player 100, which is provided with the hold status changeover switch 108 having another configuration and can further improve its usability, will be described.

Figures 11, 12:
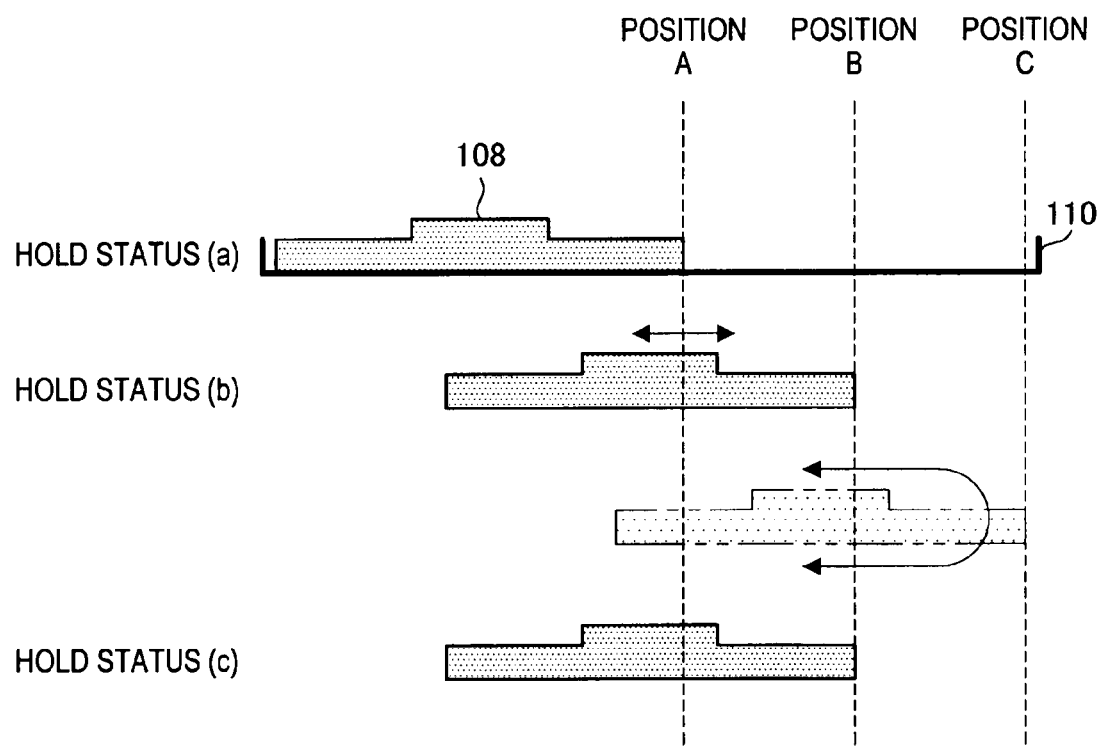
FIG. 11 is a conceptual diagram showing a relationship between positions when the hold status changeover switch 108 is slid and hold statuses corresponding to the positions, according to a first modification example.
FIG. 12 is an explanatory diagram showing a relationship of validity and invalidity of the function of the touch panel 102 and the function of the content control button 104 in each hold status according to the first modification example.

FIG. 11 is a conceptual diagram showing a relationship among the positions where the hold status changeover switch 108 is slid and the hold statuses corresponding to the positions, in the first modification example. FIG. 12 is an explanatory diagram showing a relationship between the validity and invalidity of the functions of the touch panel 102 and the content control button 104 in the respective hold statuses.

As shown in FIG. 11, the hold status changeover switch 108 of the first modification example is slid in a graduated manner and set at the position A (first switching position) and the position B (second switching position) by user's operations. However, the hold status changeover switch 108 of the first modification example is not set to the position C when the hold status changeover switch 108 is slid from the position B to the opposite direction from the position A by the user's operation. After that, when the user releases the hold status changeover switch 108, the hold status changeover switch 108 automatically returns to the position B. This configuration is realized by providing a spring mechanism and the like inside the hold status changeover switch 108, for example.

In this case, for example, if a movable contact, a detecting device and the like are provided to the hold status changeover switch 108, the hold status switch instruction input unit 126 can recognize that the hold status changeover switch 108 is temporality slid to the position C from the position B. Based on the recognition, the hold status switch control unit 128 can instruct the process execution unit 130 to sequentially switch between the hold status (b) and the hold status (c) every time the hold status changeover switch 108 is temporarily slid toward the position C from the position B.

The structure for temporality sliding the hold status changeover switch 108 from the position B to the position C and the method for detecting the temporal sliding are not limited to the above example. For example, the technology disclosed in Japanese Patent Application Laid-Open No. 2008-97934 can be used and the configuration and the detection method of the hold status changeover switch 108 are not limited to a particular configuration and a method as long as the hold status changeover switch 108 is temporarily slidable from the position B to the direction toward the position C.

Further, in the first modification example, since the functions of the touch panel 102 and the content control button 104 under the respective hold statuses (a), (b) and (c) are set as shown in the diagram of FIG. 12, the usability of the portable music player 100 can be improved.

As shown in FIG. 12, the hold status (a) corresponds to the "hold enable status," which disables the functions of both the touch panel 102 and the content control button 104. The hold status (b) corresponds to the "touch panel hold status," which disables only the functions of the touch panel 102 and enables the functions of the content control button 104. The hold status (c) corresponds to the "hold release status," which enables the functions of both the touch panel 102 and the content control button 104.

In other words, when the hold status changeover switch 108 is set at the position A, the user is not allowed to operate the touch panel 102 and the content control button 104. When the hold status changeover switch 108 is set at the position B, the user is allowed to operate at least the content control button 104. Further, the user can sequentially switch the validity and invalidity of the functions of the touch panel 102 by temporarily sliding the content control button 104 from the position B toward the position C.

Sliding a single slide switch to three set positions as described in the above embodiment is not very effective regarding operations. However, in the first modification example, the number of the positions where the hold status changeover switch 108 is set is only two. With this configuration, when the user does not operate the portable music player 100 at all, the hold status changeover switch 108 is set at the position A so that malfunctions via the touch panel 102 and the content control button 104 can surely be prevented. Further, when the user desires to operate the content control button 104, the hold status changeover switch 108 is set at position B. In this case, in order to use the touch panel 102, the user can temporarily slide the hold status changeover switch 108 from the position B in the direction opposite to the position A so that the operation of the touch panel 102 is enabled. Further, after the operation of the touch panel 102 is finished, the user can temporarily slide the hold status changeover switch 108 from the position B in the direction opposite to the position A to enable the functions of the touch panel 102 so that malfunctions can surely be prevented.

Further, in the first modification example, two hold statuses (touch panel hold status and hold release status) can be switched using the same position B. With this configuration, when the hold status changeover switch 108 is at the position B, those two hold statuses can be automatically switched without a use's operation via the hold status changeover switch 108. Second and third modification examples, in which the two hold statuses can be automatically switched, will be described

6-2. Second Modification Example

In the above-described embodiment, the touch panel 102 displays a menu screen and the like when the user presses the touch panel display button 106. However, for example, in the touch panel hold status, the user is not allowed to operate the touch panel 102 even when the user presses the touch panel display button 106. Thus, the user has to do troublesome operations such as operating the hold status changeover switch 108 to change to the hold release status after (or before) pressing the touch panel display button 106.

Figure 13:
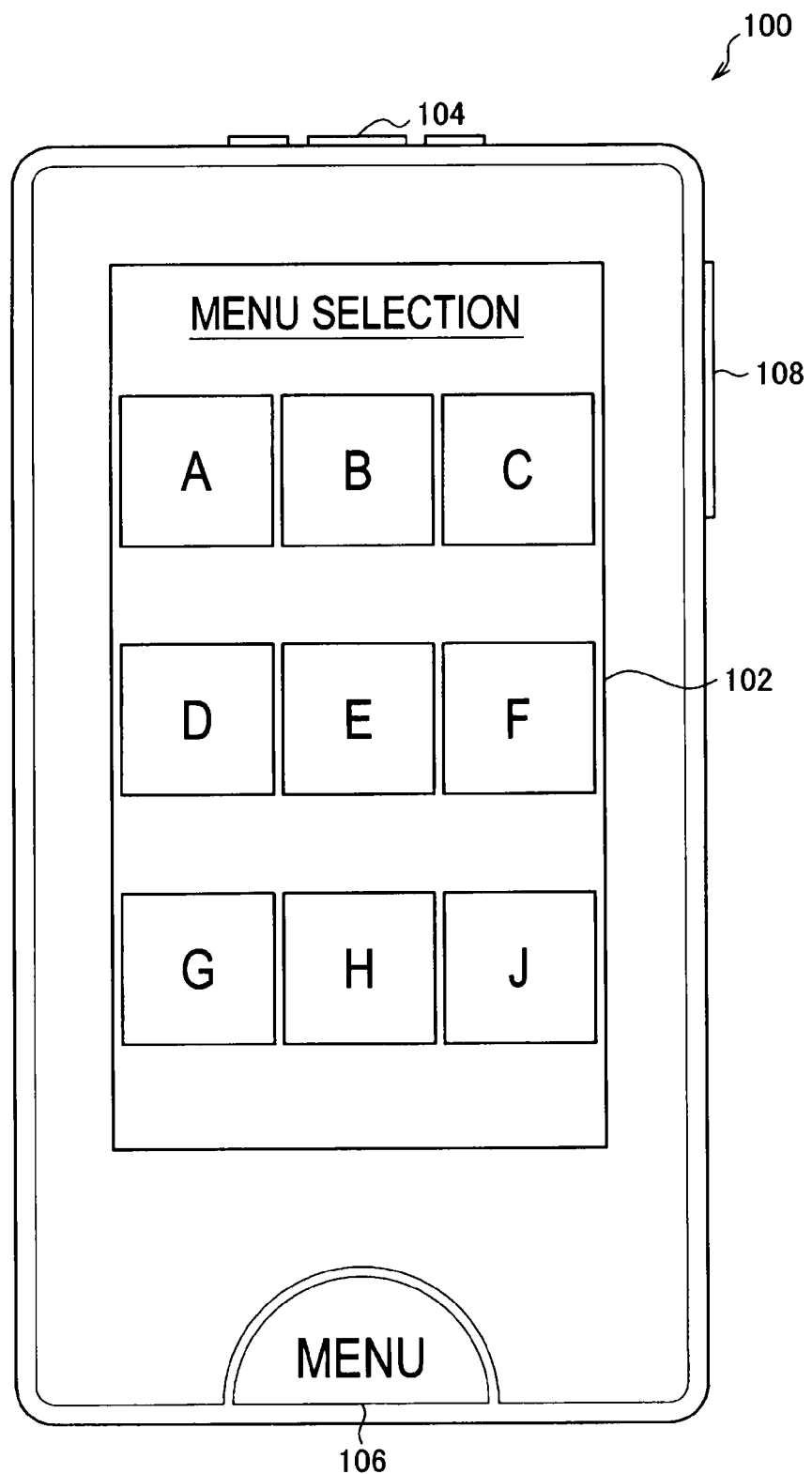
FIG. 13 is an explanatory diagram showing an example of a menu screen displayed on the touch panel 102.

Here, the menu screen displayed on the touch panel 102 is assumed to be a list of functions included in the portable music player 100 as shown in FIG. 13, for example. Thus, when the user presses the touch panel display button 106, the user is likely to desire to operate the touch panel 102 to execute a certain function. In such a situation, the user has to operate the hold status changeover switch 108 to change to the hold release status before or after pressing the touch panel display button 106 and this can reduce the usability of the portable music player 100.

In this point of view, in a second modification example, the above issue can be solved by using the hold status changeover switch 108 described in the first modification example. In more detail, when the user presses the touch panel display button 106 in the touch panel hold status, the process execution unit 130 controls the touch panel 102 to display the menu screen and automatically switches the hold status to the hold release status.

Figure 14:
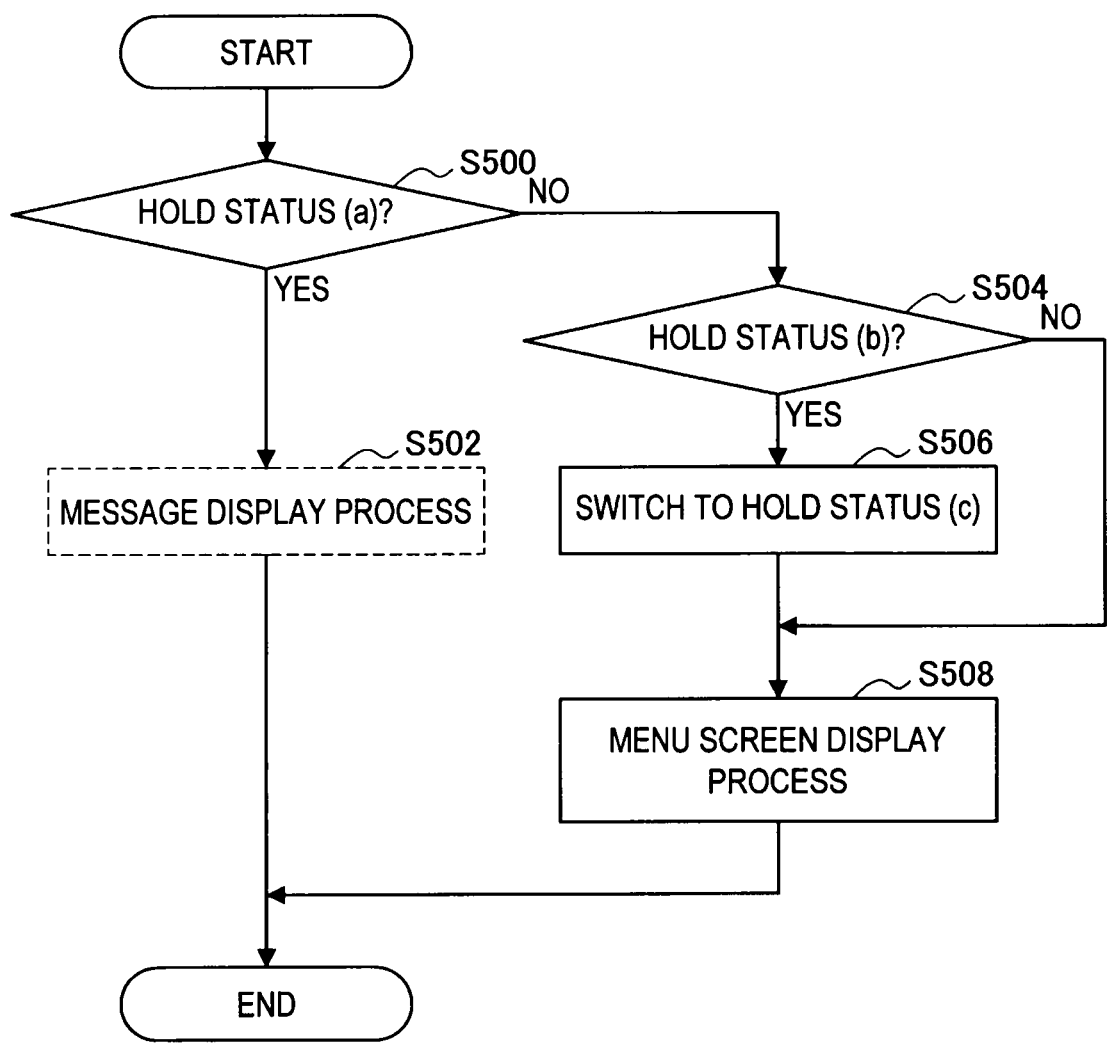
FIG. 14 is a flowchart showing an example of a process when the user presses a touch panel display button 106, according to a second modification example.

A process flow when the user presses the touch panel display button 106 will be described. FIG. 14 is a flowchart of a process when the user presses the touch panel display button 106. The process shown in FIG. 14 is a process when the user presses the touch panel display button 106, that is, when a signal including information related to a process of displaying a menu screen is sent from the touch panel display instruction input unit 124 to the process execution unit 130.

As shown in FIG. 14, in step 500, the process execution unit 130 determines whether or not the current hold status is the hold status (a), that is, the hold enable status.

When it is determined that the current hold status is the hold status (a) in step 500, the process execution unit 130 controls the touch panel 102 via the touch panel display control unit 132 to display a certain message in step 502. The messages displayed on the touch panel 102 can be assumed as "Touch panel 102: Hold is ON" and "Release hold function," for example. In the hold status (a), since the user has not been using the portable music player 100 at all, the user has to operate the hold status changeover switch 108 to operate the touch panel 102.

It is noted that the process of displaying the message in step 502 is a process that is optionally executed in order to improve the usability of the portable music player 100 and does not have to be executed in all the cases. Further, in step 502, the process execution unit 130 may control the touch panel 102 to display the message and the menu screen at the same time.

On the other hand, when it is determined that the current hold status is not the hold status (a) in step 500, the process execution unit 130 determines whether the current hold status is the hold status (b), that is, the touch panel hold status in, step 504.

When it is determined that the current hold status is the hold status (b) in step 504, the process execution unit 130 automatically switches the hold status to the hold status (c), that is, the hold release status, in step 506. Further, the process execution unit 130 controls the touch panel 102 to display a menu screen via the touch panel display control unit 132 in step 508. As a result, in touch panel hold status (hold status (b)), the user does not have to operate the hold status changeover switch 108 in order to display the menu screen on the touch panel 102 by pressing the touch panel display button 106.

On the other hand, it is determined that the current hold status is not the hold status (b) in step 504, it means the hold status is the hold release status (touch panel hold status (c)). The process execution unit 130 thus controls the touch panel 102 via the touch panel display control unit 132 to display the menu screen, in step 508.

In this manner, in the touch panel hold status (hold status (b)), the process execution unit 130 can automatically change the hold status to the hold release status without a user's operation of the hold status changeover switch 108. As a result, the portable music player 100 of the second modification example can reduce user's troublesome operation, thereby further improving its usability.

6-3. Third Modification Example

The automatic switching operation of the hold status described in the second modification example is not a process which is executed only when the touch panel display button 106 is pressed by the user. As another example of an execution of the automatic switching process of the hold status, a third modification example, in which an automatic hold function switching process is executed when the power is supplied.

For example, when the portable music player 100 is not operated by the user for a previously set certain period of time, power supply may be automatically stopped using a function of a sleep mode and the like. When power is resupplied in this condition, in the portable music player 100 provided with the hold status changeover switch 108 having the above-described three set positions, the hold status set before power supply remains until the hold status changeover switch 108 is slid. In general, when the user resupplies the power, the user is assumed to desire to operate the touch panel 102. Thus, in the portable music player 100 according to the above-described embodiment, the user has to operate the hold status changeover switch 108 after (or before) resupplying the power in order to switch to the hold release status and this can reduce the usability of the portable music player 100.

In this point of view, the third modification example will solve the above issue by providing the hold status changeover switch 108 described in the first modification example and a method similar to the method described in the second modification example. Concretely, when the user resupplies the power after the power of the portable music player 100 is stopped in the touch panel hold status, the process execution unit 130 restarts the power supply and automatically switches the hold status to the hold release status.

Figure 15:
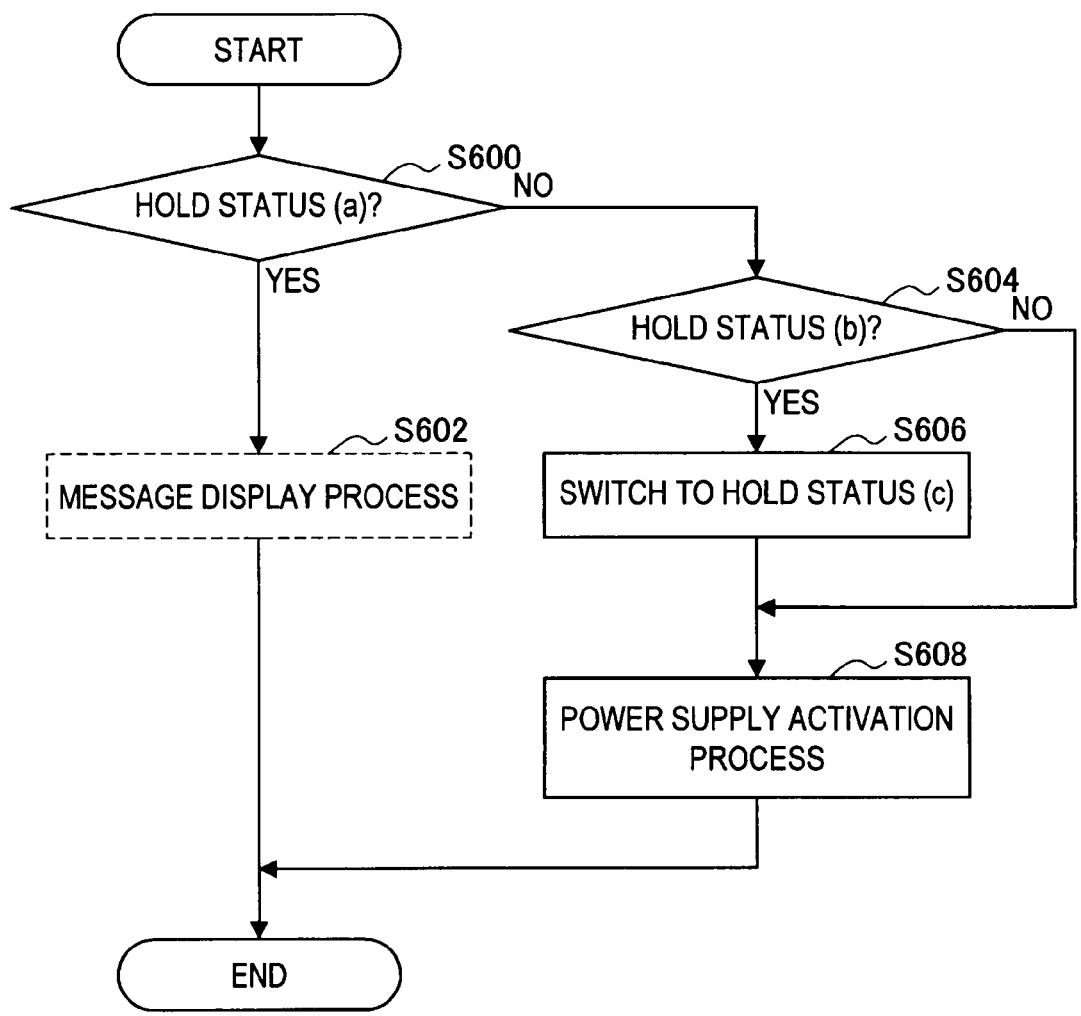
FIG. 15 is a flowchart showing a process when the user restarts the power supply of the portable music player 100, according to a third modification example.

Hereinafter, a process flow when the user resupplies the power to the portable music player 100 will be described. FIG. 15 is a flowchart of a process when the user resupplies the power to the portable music player 100.

As shown in FIG. 15, in step 600, the process execution unit 130 determines whether the current hold status is the hold status (a), that is, the hold enable status.

When it is determined that the current hold status is the hold status (a) in step 600, the process execution unit 130 controls the touch panel 102 via the touch panel display control unit 132 to display a certain message in step 602. The message displayed on the touch panel 102 can be "Hold function is ON." or "Release hold function." for example. In case of the hold enable status, since the user is not using the portable music player 100 at all, the user's operation of restarting the power supply is not accepted.

Further, the message display process in step 602 is a process which is optionally executed to improve the usability of the portable music player 100 and not to be executed for all cases. It is noted that, in step 602, the process execution unit 130 may execute a power supply process at the same time when message is displayed, in accordance with the product specification and the like of the portable music player 100. In this case, after restarting the power supply, the user has to operate the hold status changeover switch 108 to release the hold function of the touch panel 102.

On the other hand, when it is determined that the current hold status is not the hold status (a) in step 600, the process execution unit 130 determines whether the current hold status is the hold status (b), that is, the touch panel hold status, in step 604.

When it is determined that the current hold status is the hold status (b) in step 604, the process execution unit 130 automatically switches the hold status to the hold status (c), that is, the hold release status, in step 606. Further, the process execution unit 130 executes a process of resupplying the power in step 608. With this configuration, when the power is resupplied after the power supply is stopped in the touch panel hold status, the user is allowed to operate the touch panel 102 immediately without operating the hold status changeover switch 108 to release the hold function of the touch panel 102.

On the other hand, when it is determined that the current hold status is not the hold status (b) in step 604, it means the hold status is the hold release status (touch panel hold status (c)). Thus, the process execution unit 130 executes a process of restarting the power supply in step 608.

As described above, when the power is resupplied after power is stopped in the touch panel hold status, the process execution unit 130 can automatically change the hold status to the hold release status without a user's operation of the hold status changeover switch 108. With this configuration, the portable music player 100 of the third modification example can reduce the user's troublesome operations and further improve its usability.

6-4. Fourth Modification Example

In the portable music player 100 according to the above embodiment and modification examples, when the hold status is switched, it may be required to show the change of the hold status or the current hold status to the user. In this point of view, the portable music player 100 of a fourth modification example will be described. According to the portable music player 100 of the fourth modification example, when the hold status is switched, the display of the touch panel 102 is updated so that the current hold status can be shown to the user and this can improve the usability of the portable music player 100.

Since the portable music player 100 has plurality of hold statuses, the touch panel 102 preferably display different marks and the like corresponding to the respective hold status. Here, for example, the current hold status can be shown to the user by simply displaying different key-shaped icons corresponding to the respective hold statuses. However, a display method for showing the current hold status more clearly to the user will be described. The display process of the touch panel 102 described below is executed by the above described touch panel display control unit 132.

Figure 16:
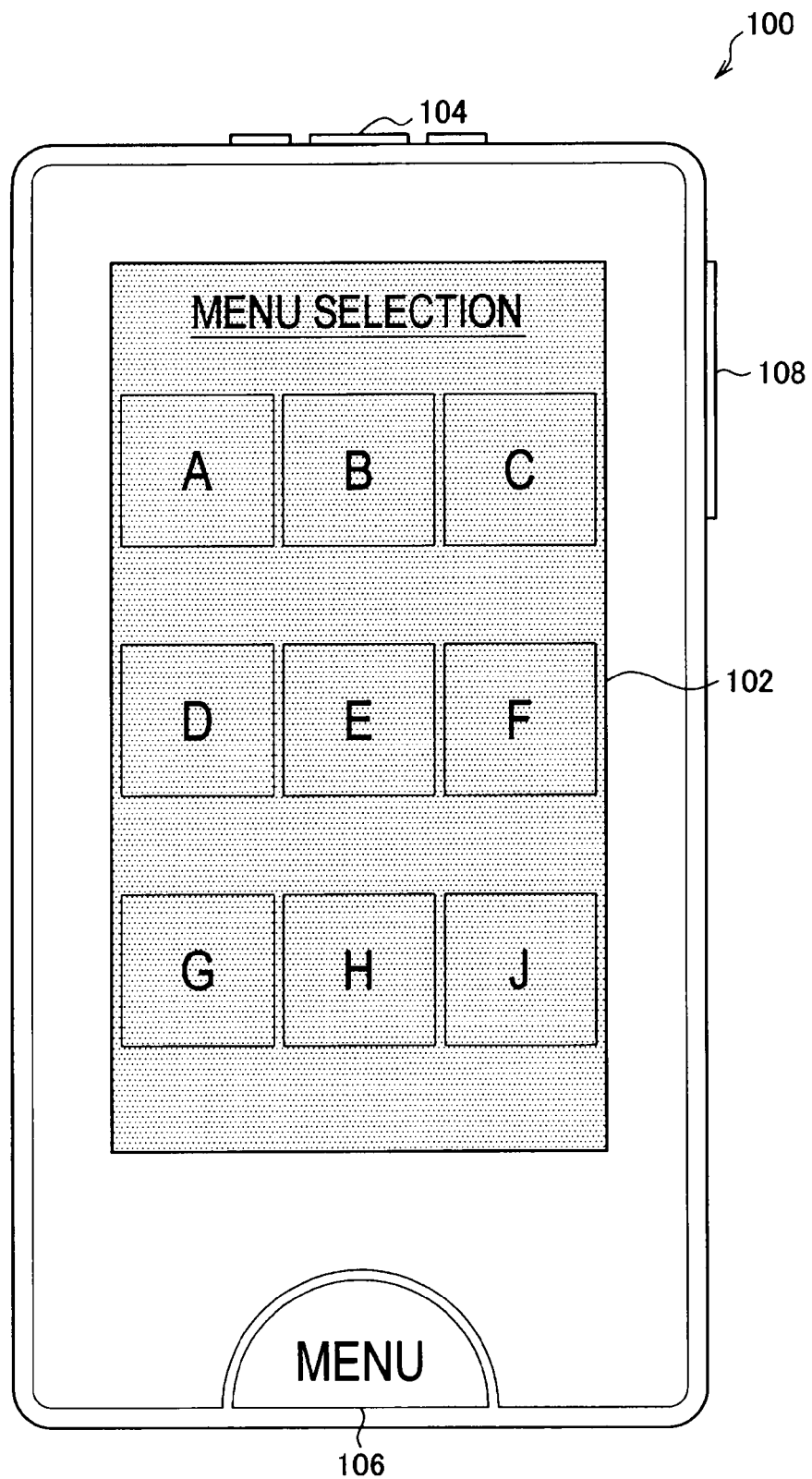
FIG. 16 is an explanatory diagram showing an example of a display of the touch panel 102 when the hold status is changed, according to a fourth modification example.

FIG. 16 is an explanatory diagram showing a display example of the touch panel 102 when the hold status is changed. The example shown in FIG. 16 is a display example of the touch panel 102 when the user operates the hold status changeover switch 108 and switches the hold status from the hold release status to the touch panel hold status while operating the menu screen displayed on the touch panel 102.

As shown in FIG. 16, while the menu screen operated by the user remains, a certain blind image is shown overlapping with the menu screen on the touch panel 102. In this manner, since a blind image is displayed over the screen, the user can clearly recognize that the operation of the touch panel 102 is not available. Further, different types of the blind images, for example, colors, hatching, transparency and the like can be changed between the touch panel hold status and the hold enable status so that the user can recognize the difference between the current hold statuses. Further, since the screen which was operated on the touch panel 102 is kept shown behind the blind image, the user can clearly recognize that which operation he or she can start with if the hold function of the touch panel 102 is released.

Figure 17:
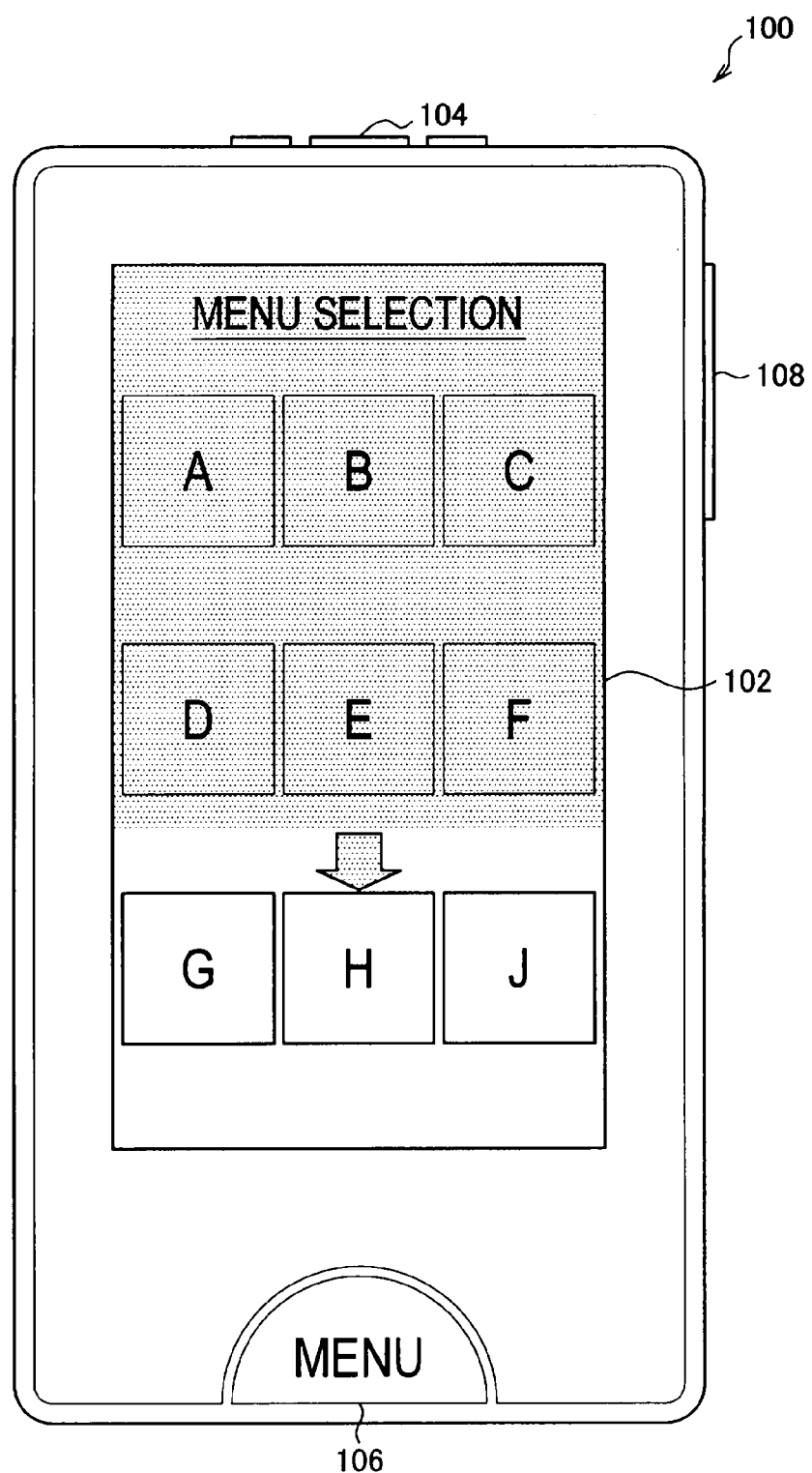
FIG. 17 is an explanatory diagram showing an example of a method for displaying a blind image of FIG. 16 according to the fourth modification example.

FIG. 17 is an explanatory diagram showing an example of a method of displaying the blind image shown in FIG. 16. As shown in FIG. 17, the touch panel display control unit 132 can display a blind image being slid from a certain position on the touch panel 102 so as to overlap with the menu screen, which is already shown on the touch panel 102. The user sees the blind image displayed as if a shutter is being pull down on the touch panel 102. Thus, the user can easily recognize that the functions of the touch panel 102 are disabled.

Further, in a case where the blind image is slid, the touch panel display control unit 132 can slide the blind image from a certain position on the touch panel 102 in the same direction of the sliding direction of the hold status changeover switch 108. For example, when the user downwardly slides the hold status changeover switch 108 to switch the hold status, the touch panel display control unit 132 displays the blind image as sliding from the upper side toward the lower side on the touch panel 102. In contrast, when the user upwardly slides the hold status changeover switch 108 to switch the hold status, the touch panel display control unit 132 displays the blind image as sliding from the lower side toward the upper side on the touch panel 102. With this configuration, since the blind image is displayed corresponding to the user's operation, the user can clearly recognize that the process of switching the hold function corresponding to the user's operation has been surely executed.

Further, when an acceleration sensor is provided to the portable music player 100, for example, the touch panel display control unit 132 may typically display the blind image as sliding from the upper side toward the lower side on the touch panel 102 corresponding to the tilted degree of the portable music player 100.

Further, the touch panel display control unit 132 may determine whether to display the blind image according to the content being displayed on the touch panel 102. For example, as shown in the example of FIG. 16, when the user switches to the touch panel hold status or the hold enable status while the menu screen is displayed, generally, it is assumed that the user is not going to use the touch panel 102. Thus, the touch panel display control unit 132 overlaps the blind image with the menu screen as shown in the above example to show the current hold status to the user.

On the other hand, for example, when a moving image or a slide show of still images is being displayed on the touch panel 102, the user will continuously see the touch panel 102 even if the user switches to the touch panel hold status or hold enable status. Thus, when a moving image content or a still image content is being reproduced on the touch panel 102, the touch panel display control unit 132 does not display the above-described blind image over the moving image or still image. With this configuration, the user can clearly see the moving images and still images displayed on the touch panel 102. In this case, the touch panel display control unit 132 may display a key-shaped icon and the like, which indicates the current hold status, on the touch panel 102.

As described above, the portable music player 100 of the fourth modification example can further improve the usability by changing the displaying method of the touch panel 102 when the hold status is changed.

7. A HARDWARE CONFIGURATION OF PORTABLE MUSIC PLAYER 100

A hardware configuration of the portable music player 100 according to the present embodiment will be described in detail with reference to FIG. 18. FIG. 18 is a block diagram for explaining a hardware configuration of the portable music player 100 according to the present embodiment.

The portable music player 100 mainly includes a CPU 901, a ROM 903, a RAM 905, a bridge 909, an interface 913, an input device 915, an output device 917, a storage device 919, a drive 921 and a connection port 923.

The CPU 901 serves as a processing device or a control device and controls an entire or a part of operations of the portable music player 100 according to various programs stored in the ROM 903, RAM 905, storage device 919, or a removable recording medium 927. The ROM 903 stores programs, calculation parameters and the like, which are used by the CPU 901. The RAM 905 temporarily stores programs used in a process by the CPU 901 and parameters and the like, which vary as appropriate during the process. These components are connected to each other via a host bus 907, which is composed of internal buses such as a CPU bus.

The host bus 907 is connected to an external bus 911 such as a PCI (Peripheral Component Interconnect/Interface) bus via the bridge 909.

The input device 915 is an operation means, such as a touch panel, a button, a switch, or a lever, which is operated by the user. The input device 915 may be, for example, a remote control means (that is, a remote controller) using infrared rays or other radio waves. Here, the input device 915 includes the touch panel 102, content control button 104, touch panel display button 106, hold status changeover switch 108 and the like.

The output device 917 is composed of devices that are capable of visually or auditorily informing various information to a user, which are, for example, a display device such as a liquid crystal display, a plasma display and an EL display and an audio output device such as a speaker and a headphone. Here, the output device 917 serves as a display which configures the above described touch panel 102.

The storage device 919 is a device for storing data described as an example of a storage unit of the portable music player 100 and is composed of a magnetic storage device such as an HDD, a semiconductor storage device, an optical storage device and a magneto-optic storage device, for example. The storage device 919 stores programs executed by the CPU 901 and various data such as music data, moving image data and still image data.

The drive 921 is a reader/writer of a recording medium and installed inside or outside of the portable music player 100. The drive 921 reads information recorded in the attached removable recording medium 927 such as a magnetic disk, an optical disk, a magneto-optic disk or a semiconductor memory and outputs the information to the RAM 905. Further, the drive 921 is able to write music data and the like to the attached removable recording medium 927.

The connection port 923 is a port to be directly connected to an external connection device 929 such as a USB port, an optical audio terminal and an HDMI (High-Definition Multimedia Interface) port. When the external connection device 929 is connected to the connection port 923, the portable music player 100 is capable of obtaining music data, image data, moving image data and the like from the external connection device 929 and transferring various data to the external connection device 929.

An example of the hardware configuration capable of executing the functions of the portable music player 100 according to embodiments of the present invention has been described. The above respective components may be composed of general members or specialized hardware for the functions of the respective components. Thus, the hardware configuration can be changed according to need based on the technology level in every case where the present embodiment is executed.

8. CONCLUSION

As described above, the portable music player 100 according to the present embodiment has a single hold status changeover switch 108 and can switch three hold statuses in response to user's operation of the hold status changeover switch 108. When the hold status changeover switch 108 is configured to switch two hold statuses using one position, the portable music player 100 can automatically switch the hold statuses without the user's operation. When the hold function is switched, the display of the touch panel 102 can be changed corresponding to the respective hold status so that the user can clearly recognize the current hold status. Further, when the display of the hold status is changed corresponding to the content being displayed on the touch panel 102, the comfortability of the usage of the touch panel 102 can improve.

In other words, in the portable music player 100 according to the present embodiment, with the single hold status changeover switch 108, the hold statuses of the touch panel 102 and the content control button 104 can be selectively switched, thereby improving the usability.

It should be understood by those skilled in the art that various modifications, combinations, sub-combinations and alterations may occur depending on design requirements and other factors insofar as they are within the scope of the appended claims or the equivalents thereof.

For example, in the above embodiment, the portable music player 100 is described as an example of a portable information terminal; however the present invention should not be limited to the example. The portable information terminal can be a portable phone, a PDA, a portable game machine, a digital camera or a digital video camera for example, as long as a touch panel function, a function for reproducing certain contents, an operation button related to a content reproduction are included.

Further, according to the second and third modification examples, the function for automatically switching the hold status when a menu screen is displayed and when the power supply is restarted is described; however the present invention should not be limited to those examples. In other words, the second and third modification examples employ the configuration, which allows switching between at least two hold statuses while the hold status changeover switch 108 is set at a single position. Thus, when the hold status changeover switch 108 having the same components is provided, the hold statuses can be automatically switched when a certain process is executed in addition to the cases of displaying a menu screen and restarting the power supply.

In this specification, the steps in flowcharts include not only processes executed in the sequential order described in the flowchart but also processes executed in parallel or independently regardless of the sequential order. It should be appreciated that even the steps executed in the sequential order can be executed in different order according to need. For example, the process of determining the hold status, shown in the flowcharts does not have to be executed in the order of the flowcharts.

The present application contains subject matter related to that disclosed in Japanese Priority Patent Application JP 2008-276226 filed in the Japan Patent Office on 28 Oct. 2008, the entire content of which is hereby incorporated by reference.

What is claimed is:

1. A portable information terminal comprising:
a detecting unit configured to detect an operation on a display screen;
a content control button configured to perform an operation related to a content reproduction;
a hold status changeover switch; and
a control unit configured to switch among a plurality of hold statuses of the detecting unit and the content control button according to an operation of the hold status changeover switch, wherein
the control unit switches among the plurality of hold statuses of the detecting unit and the content control button to one of a first hold status which disables functions of both the detecting unit and the content control button, a second hold status which disables the function of only the detecting unit, and a hold release status which enables functions of both the detecting unit and the content control button, according to the operation of the hold status changeover switch.

2. The portable information terminal according to claim 1, wherein
the hold status changeover switch is a slide switch that is slidable between a first position corresponding to the first hold status and a second position corresponding to the second hold status or the hold release status and is configured to automatically return to the second position when slid from the second position in a direction opposite to the first position, and
the control unit
switches to the first hold status when the hold status changeover switch is slid to the first position,
switches to the hold release status when the hold status changeover switch is slid from the first position to the second position, and
switches between the hold release status and the second hold status alternatively when the hold status changeover switch is at the second position and is slid from the second position in the direction opposite to the first position.

3. The portable information terminal according to claim 2, further comprising
another button for an operation of instructing the display to display a certain screen with respect to the display screen,
wherein the control unit switches the hold status from the second hold status to the hold release status when an operation is input via the another button in the second hold status.

4. The portable information terminal according to claim 3, wherein
when the portable information terminal is turned off in the second hold status, the control unit switches the hold status from the second hold status to the hold release status according to an operation of turning on the portable information terminal.

5. The portable information terminal according to claim 1, wherein the hold status changeover switch is a slide switch slidable among a first position corresponding to the first hold status, a second position corresponding to the second hold status, and a third position corresponding to the hold release status, and
the control unit
switches to the hold release status when the hold status changeover switch is slid to the third position,
switches to the second hold status when the hold status changeover switch is slid to the second position, and
switches to the first hold status when the hold status changeover switch is slid to the first position.

6. The portable information terminal according to claim 1, wherein
on the display, different images are displayed according to the hold status.

7. The portable information terminal according to claim 6, wherein
on the display, an image, which indicates the hold status, is displayed from a certain position on the display as overlapping with an image previously displayed on the display.

8. The portable information terminal according to claim 1, wherein the content reproduction reproduces music.

9. The portable information terminal according to claim 1, wherein the operation related to the content reproduction includes at least one of frame advance, skipping ahead, pausing, and volume adjusting.

10. A hold status switch method of an information processing apparatus, including a detecting unit configured to detect an operation on a display screen and a content control button configured to perform an operation related to a content reproduction, the method comprising the steps of:
detecting an operation on a hold status changeover switch; and
switching among a plurality of hold statuses of the detecting unit and the content control button according to the detected operation to the hold status changeover switch,
wherein switching among the plurality of hold statuses includes switching among a first hold status which disables functions of both the detecting unit and the content control button, a second hold status which disables the function of only the detecting unit, and a hold release status which enables functions of both the detecting unit and the content control button, according to the detected operation of the hold status changeover switch.

11. The portable information terminal according to claim 1, wherein
the display screen includes a touch screen interface with the operation being an input received thereon.

12. The hold status switch method of claim 10, wherein the step of switching further comprises:
switching to the first hold status when the hold status changeover switch is operated to a first position,
switching to the second hold status when the hold status changeover switch is operated to a second position, and
switching to the hold release status when the hold status changeover switch is operated to a third position.

13. A non-transitory computer-readable storage medium having a computer-readable program stored therein that when executed by a computer causes the computer to perform a method of an information processing apparatus, including a detecting unit configured to detect an operation on a display screen and a content control button configured to perform an operation related to a content reproduction, the method comprising the steps of:

detecting an operation on a hold status changeover switch; and switching among a plurality of hold statuses of the detecting unit and the content control button according to the detected operation to the hold status changeover switch, wherein switching among the plurality of hold statuses includes switching among a first hold status which disables functions of both the detecting unit and the content control button, a second hold status which disables the function of only the detecting unit, and a hold release status which enables functions of both the detecting unit and the content control button, according to the detected operation of the hold status changeover switch.

\* \* \* \* \*